US010077096B2

(12) United States Patent
Tiberio et al.

(10) Patent No.: US 10,077,096 B2
(45) Date of Patent: Sep. 18, 2018

(54) APPARATUS FOR UNWINDING FLEXIBLE CABLES ON SEABEDS

(71) Applicant: INNOVO ENGINEERING AND CONSTRUCTION LTD., Aberdeen (GB)

(72) Inventors: Andrea Tiberio, Albignasego (IT); Stefano Malagodi, Sirmione (IT)

(73) Assignee: INNOVO ENGINEERING AND CONSTRUCTION LTD., Aberdeen (GB)

( * ) Notice: Subject to any disclaimer, the term of this patent is extended or adjusted under 35 U.S.C. 154(b) by 0 days.

(21) Appl. No.: 15/387,707

(22) Filed: Dec. 22, 2016

(65) Prior Publication Data

US 2017/0203819 A1     Jul. 20, 2017

(30) Foreign Application Priority Data

Dec. 24, 2015  (IT) .................. 102015000087809

(51) Int. Cl.
| | |
|---|---|
| *F16L 1/20* | (2006.01) |
| *B63B 35/04* | (2006.01) |
| *H02G 1/10* | (2006.01) |
| *B65H 49/32* | (2006.01) |
| *B65H 67/02* | (2006.01) |

(52) U.S. Cl.
CPC ............. *B63B 35/04* (2013.01); *B65H 49/32* (2013.01); *B65H 67/02* (2013.01); *H02G 1/10* (2013.01); *B65H 2701/34* (2013.01)

(58) Field of Classification Search
CPC .......... F16L 1/203; F16L 1/207; B63B 35/03; B63B 35/04; H02G 1/10; E21B 19/22
See application file for complete search history.

(56) References Cited

FOREIGN PATENT DOCUMENTS

| | | |
|---|---|---|
| CN | 102 897 558 | 2/2015 |
| EP | 2 743 560 | 6/2014 |
| GB | 2 046 207 | 11/1980 |
| WO | 20110105894 | 9/2011 |

*Primary Examiner* — Sean D Andrish
(74) *Attorney, Agent, or Firm* — Mark M. Friedman

(57) ABSTRACT

The present invention regards an apparatus for unwinding flexible cables on seabeds, which comprises: two first towers (2), each provided with a corresponding first vertical guide seat (5), two second towers (6), each provided with a second vertical guide seat (7), and two hub-holder groups (8), each of which slidably constrained to the second guide seat (7) of the corresponding second tower (6) and carrying, rotatably mounted thereon, a corresponding hub (3). Each second tower (6) can be moved between a first operating configuration, in which the second tower (6) is slidably constrained in the first guide seat (5) of the corresponding first tower (2), and a second operating configuration, in which the second tower (6) is arranged outside the first guide seat (5) of the corresponding first tower (2).

8 Claims, 16 Drawing Sheets

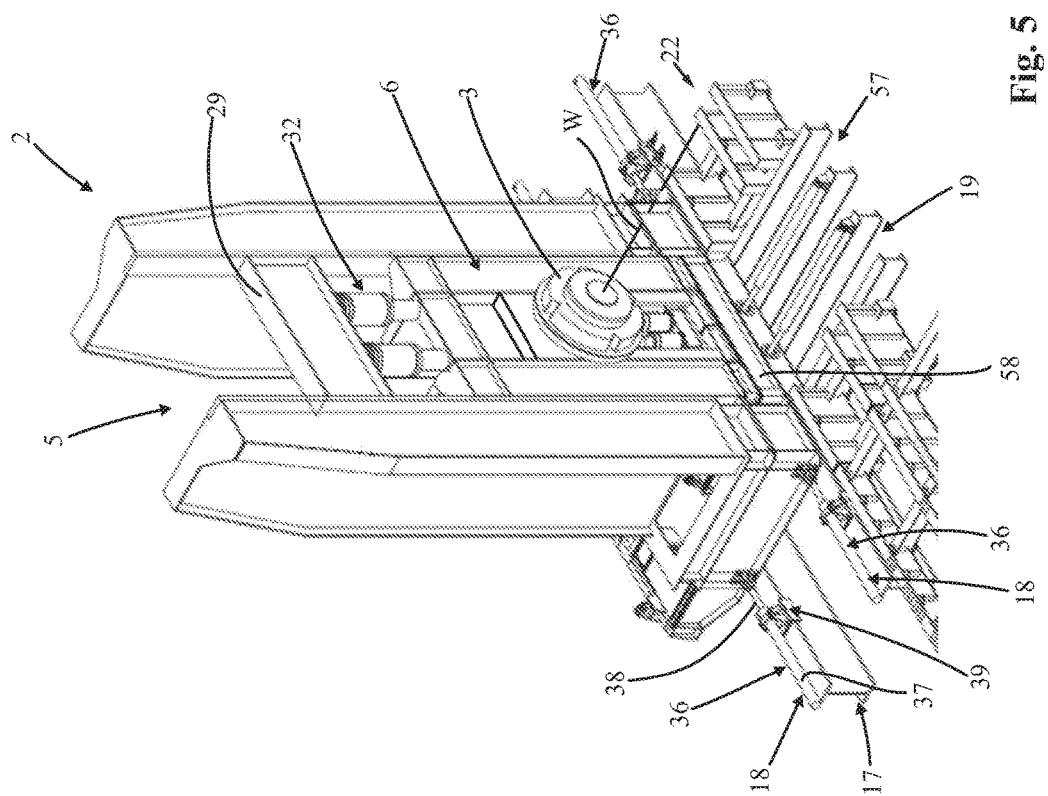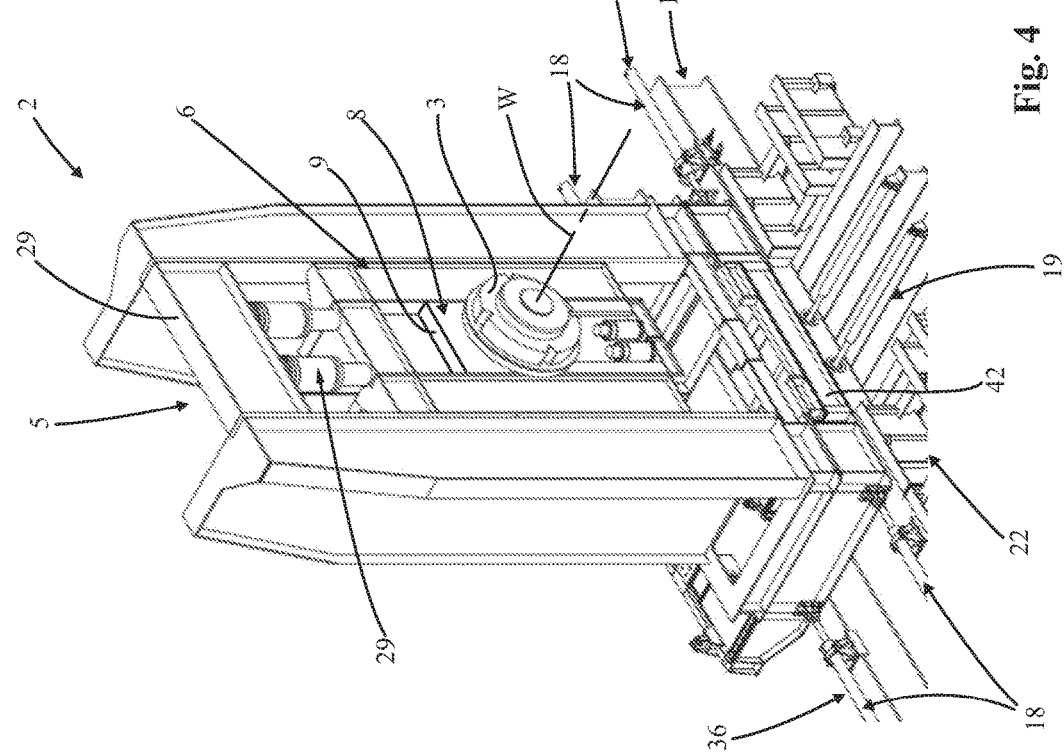

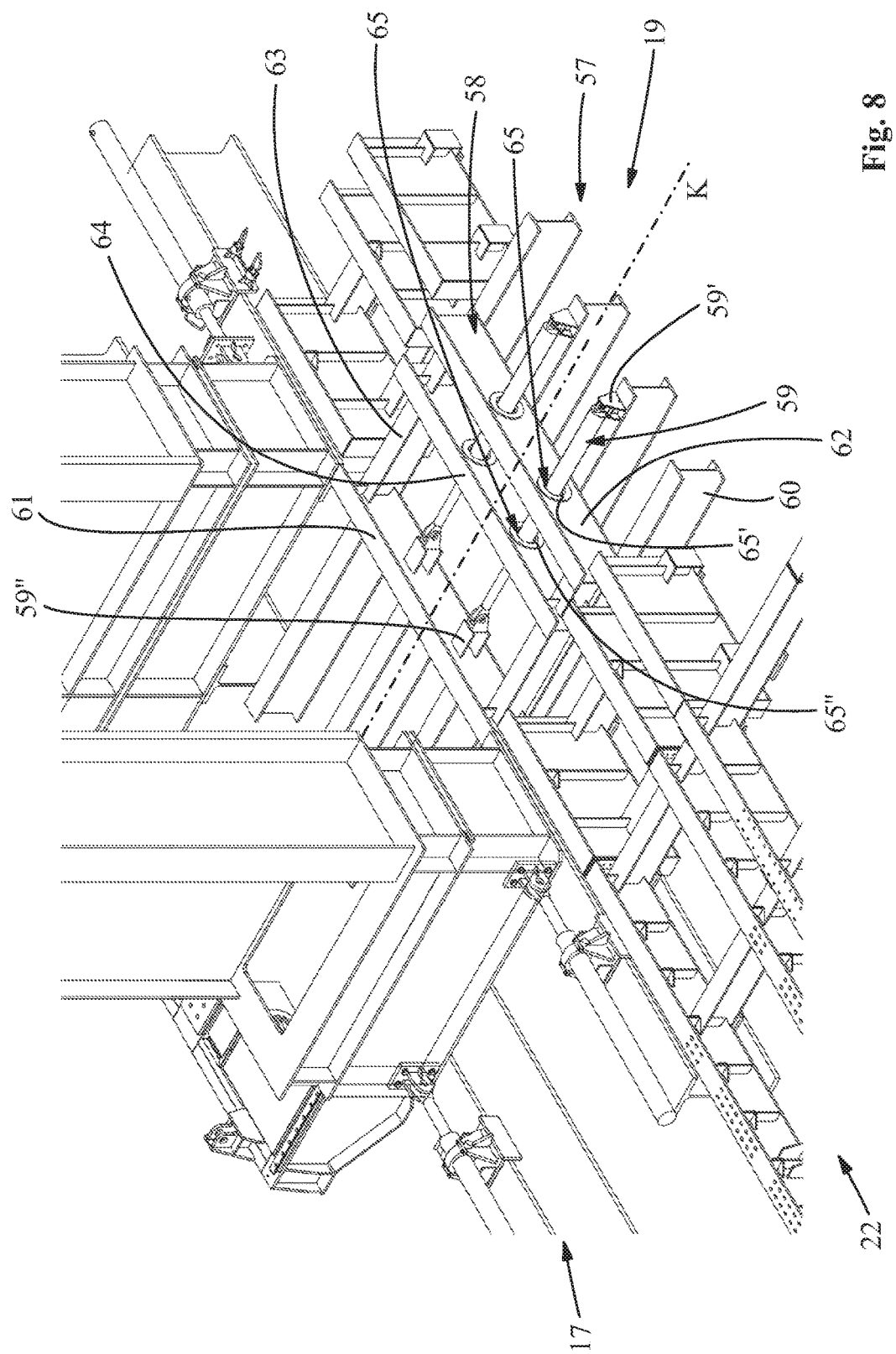

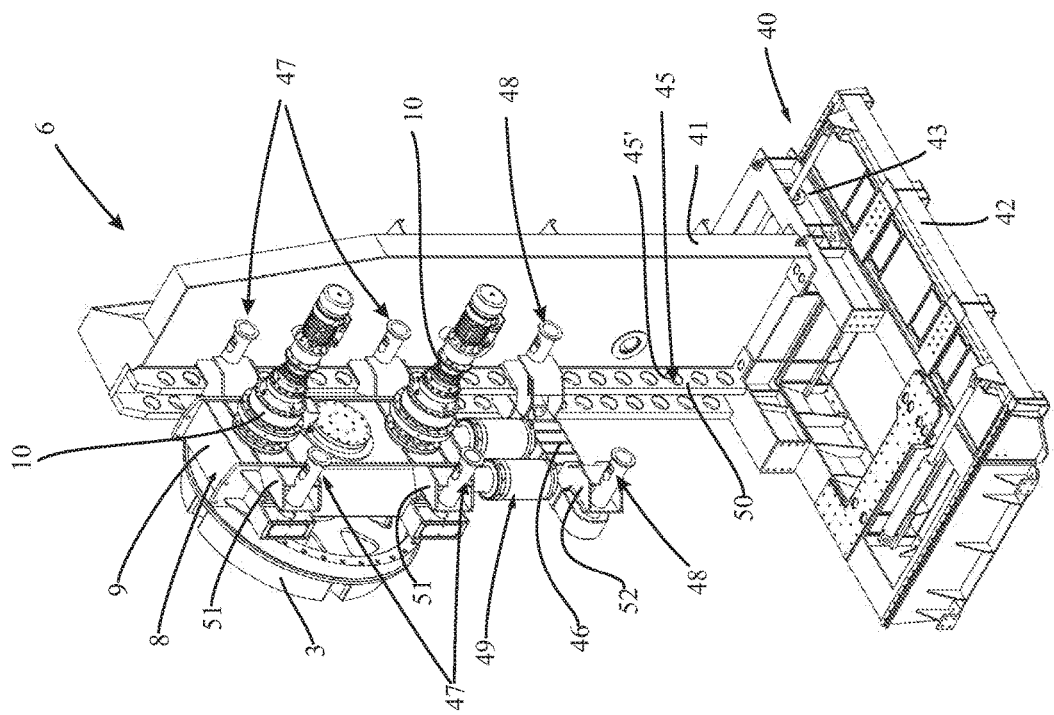
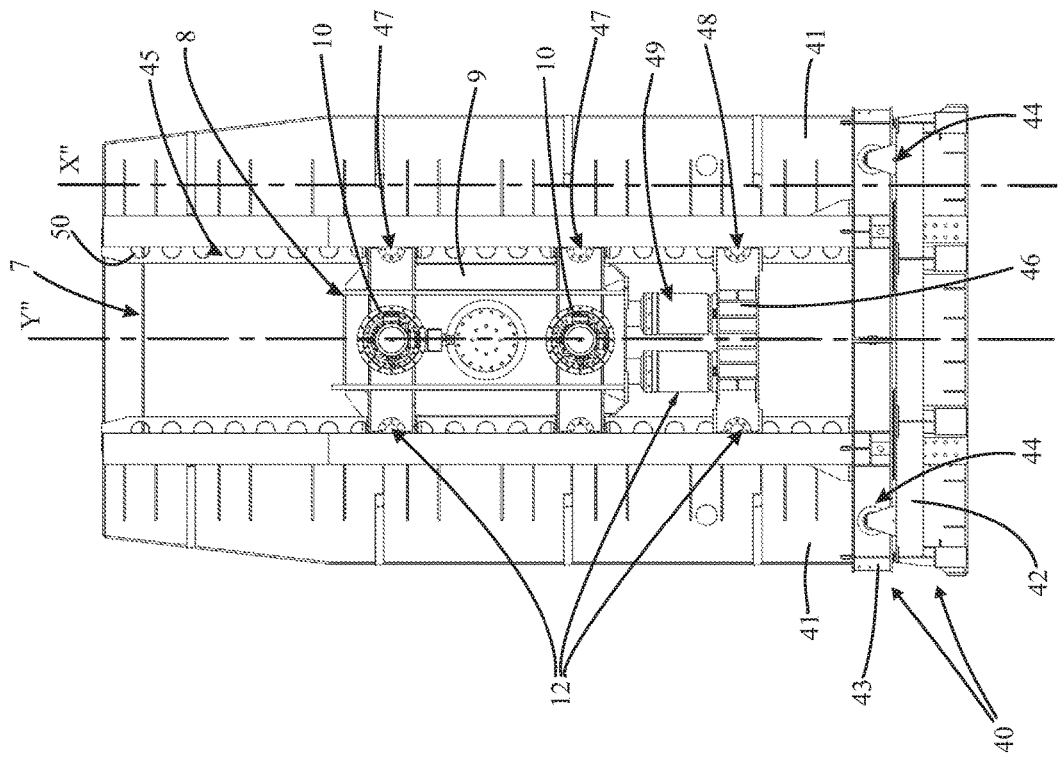

APPARATUS FOR UNWINDING FLEXIBLE CABLES ON SEABEDS

FIELD OF APPLICATION

The present invention regards an apparatus for unwinding flexible cables on seabeds.

The present apparatus falls within the industrial field of the production of offshore equipment and are intended to be used in the field of laying cables on beds of seas, lakes, basins, etcetera. More in detail, the apparatus that is the object of the present invention is intended to be mounted on ships in order to unwind reels of cables on a seabed, such as in particular flexible cables (for example an energy transmission cable, a data transmission signal cable, etc.) or cables made of yielded steel employed for example for injecting compressed air or water in an oil well.

In particular, the reels of cables intended to be unwound by means of the apparatus and the present method have diameter of about 6 to 24 meters and weight of about 200 to 2500 tons.

STATE OF THE ART

As is known, the apparatuses for unwinding cables on seabeds conventionally comprise a support structure formed by a base and by two towers which rise upward for several meters, parallel to each other, starting from the base and which together support a reel of a cable to be laid on the seabed.

More in detail, each tower is preferably obtained by means of two parallel and counter-facing columns, between which a hub-holder group that rotatably supports the reel is slidably engaged in opposite guides. The reel is usually constituted by a drum around which the cable is wound, which is rotated by motor means directly mounted on the hub-holder group of the apparatus. The apparatus also comprises at least two vertical hydraulic pistons, each of which mounted between the two columns of each tower for the lifting and lowering of the reel between lowered loading position and a raised work position.

Two horizontal hydraulic pistons are also provided for, mounted on the base in order to move the two towers towards or away from each other along rails, in order to allow the hub-holder group respectively to be engaged with the drum of the reel or be detached from the drum itself. Some examples of known apparatuses of the abovementioned type are described in the documents EP 2743560, GB 2046207, CN 102897558 and WO 2011/105894.

In operation, in order to load a reel on the apparatus, the following sequence of operations is generally provided for.

First, a reel is loaded that is supported by a metalwork saddle on the deck of a ship, and then the reel is arranged on the saddle between the two towers of the apparatus previously moved apart from each other in order to allow the interposition of the reel. At this point, the hub-holder groups are vertically lifted by the vertical pistons until they are aligned with the drum of the reel. The two towers are then brought close together by means of the actuation of the horizontal pistons, in order to bring the pinions of the hub-holder groups to engage provided ring gears integral with the drum of the reel, as well as to bring the support shafts for the hub-holder groups to be rotatably engaged with the drum of the reel.

Then, the hub-holder groups are further lifted by means of the vertical pistons in order to in turn lift the reel from the saddle, so as to allow the rotation of the reel for unwinding the cable on the seabed.

As is known, cable reels have a very considerable weight, typically many hundreds of tons, and can have length and radius sizes (and thus height) that can vary as a function of the production company, of the characteristics of the cable to be unwound or of the length of the latter.

At a same site (such as an offshore work site for making an oil well) it is often necessary to deposit various types of cables adapted for carrying out different functions.

For example, the laying of flexible cables is provided for, such as energy transmission cables, data transmission signal cables (e.g. made of optical fiber). Such flexible cables are typically wound in reels of diameter comprised between about 6 and 11 meters and of weight between 200 and 500 tons.

In addition, at the same site, the laying is also provided of cables made of yielded steel that are for example employed for injecting compressed air or water into an oil well, in order to control the leveling of the latter. Such yielded steel cables are wound in reels with diameter of about 24 meters and with weight of about 2400 tons.

The need to lay the aforesaid different types of cables requires the use of different apparatuses for the unwinding of cables, and each of these must be sized for the size and weight of the reels to be unwound (in particular, the height and the strength of the towers and the size and power of the pistons).

For such purpose, it is necessary to employ multiple ships at the same site carrying, mounted thereon, the different apparatuses for unwinding the corresponding different cable types, with consequent considerable expenses in particular for the use of multiple ships.

Otherwise, it is provided to use a single ship, which is first equipped with the apparatus for unwinding the flexible cables and, once the layer of the latter has terminated, is equipped with the apparatus for unwinding the yielded steel cables. Such solution, nevertheless, requires multiple travels of the ship along the path between the cable laying site and the work site where the apparatuses and the reels are changed, with consequent long times for attaining the laying of all the cables and high costs due to the movement of the ship.

PRESENTATION OF THE INVENTION

The problem underlying the present invention is therefore to overcome the drawbacks of the abovementioned prior art, by providing an apparatus for unwinding cables on seabeds which allows operating with reels of different weight and different size.

A further object of the present invention is to provide an apparatus for unwinding cables on seabeds which allows sequentially employing multiple reels arranged on a deck of a ship.

A further object of the present invention is to provide an apparatus for unwinding cables on seabeds which occupies relatively limited space.

A further object of the present invention is to provide an apparatus for unwinding cables on seabeds which is fully safe and entirely reliable in operation.

BRIEF DESCRIPTION OF THE DRAWINGS

The technical characteristics of the invention, according to the aforesaid objects, can be clearly seen in the contents of the below-reported claims, and the advantages thereof will be clearer in the following detailed description, made with reference to the enclosed drawings, which represent a merely exemplifying and non-limiting embodiment of the invention, in which:

FIG. 4 shows a perspective view of the first and second tower of the present apparatus, in which the second tower is arranged in raised position;

FIG. 5 shows a perspective view of the first and second tower of the present apparatus, in which the second tower is arranged in lowered position;

FIG. 8 shows a detail of the present apparatus, relative to transverse translation elements of the second tower, FIG. 9 shows a side view of the second tower of the apparatus;

FIG. 10 shows a perspective view of the second tower of the apparatus with some parts removed in order to better illustrate other parts;

DETAILED DESCRIPTION OF A PREFERRED EMBODIMENT

With reference to the set of drawings, reference number 1 overall indicates the apparatus for unwinding cables on seabeds, object of the present invention.

The present apparatus 1 is intended to be advantageously used in offshore work sites for laying cables on the bed for example of seas, lakes and water basins.

In particular, the present apparatus 1 is intended to be arranged on a support structure, such as a deck of a ship or a platform equipped for operating in an offshore work site.

With reference to the enclosed figures, the apparatus 1 comprises two first towers 2, which are arranged parallel to and spaced from each other and are extended advantageously according to corresponding first vertical extension directions X'.

Figure 3:
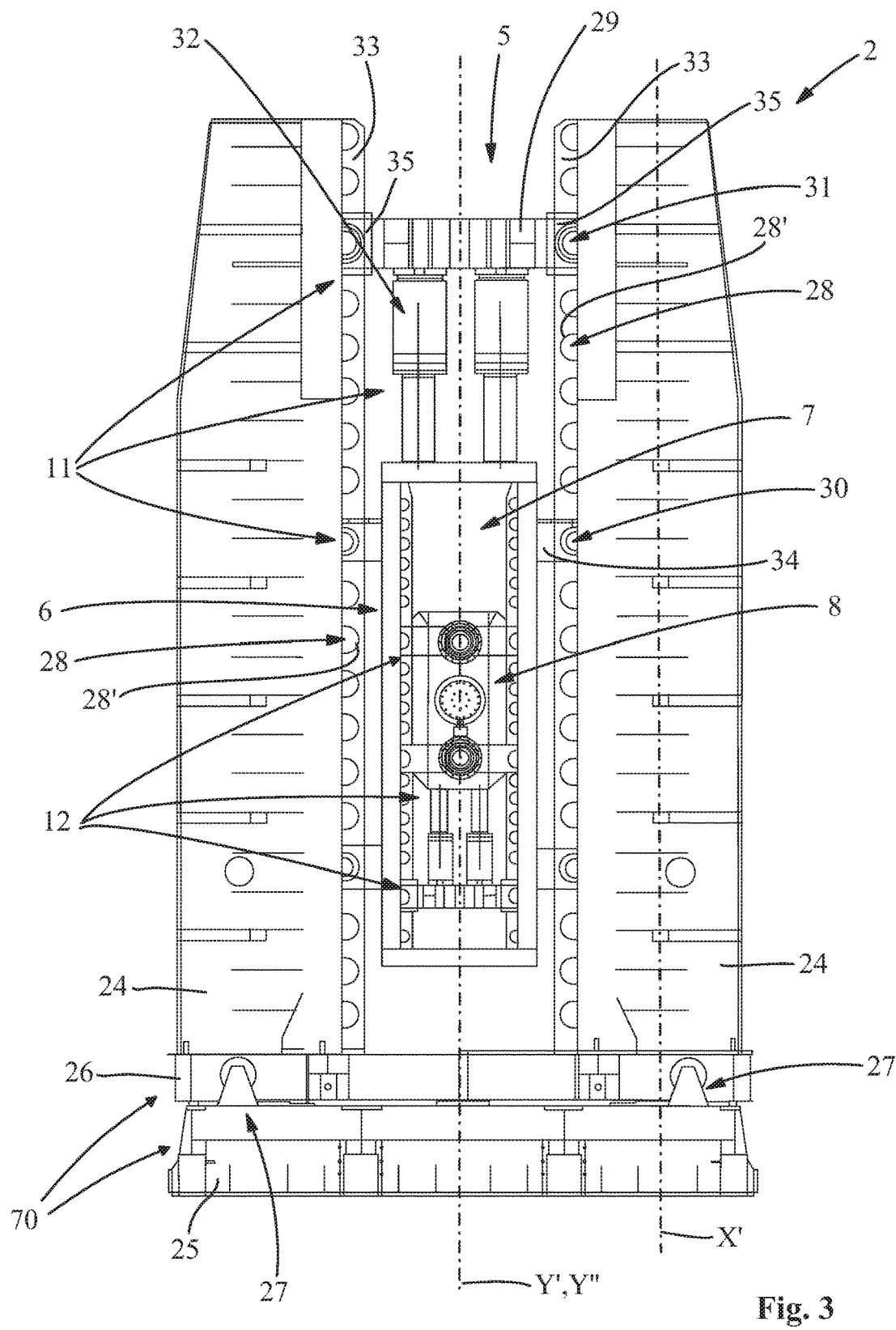
FIG. 3 shows a side view of a detail of the present apparatus, relative to the first tower of the apparatus.

In addition, with reference in particular to the embodiments illustrated in FIGS. 3 and 4, the apparatus 1 comprises two hubs 3, which are arranged facing each other, are susceptible of being associated with the corresponding first towers 2 and are susceptible of being mechanically engaged with corresponding ends of a drum 14', 16', 21' of a reel 14, 16, 21 in order to rotatably support the reel 14, 16, 21 itself.

Advantageously, the reel 14, 16, 21 is provided with a corresponding drum 14', 16', 21' around which a corresponding cable to be unwound is wound. In particular, the drum 14', 16', 21' of the reel 14, 16, 21 (such drum made for example of steel) has substantially cylindrical shape and is horizontally extended between two ends, and externally carries the corresponding cable wound thereon.

Each hub 3 is advantageously rotatably around a rotation axis W thereof, preferably horizontal and orthogonal to the first extension directions X' of the two first towers 2.

In addition, the apparatus 1 comprises movement elements arranged for moving each hub 3 along the corresponding first tower 2, in particular in order to aligned the hub 3 with the drum 14', 16', 21' of the reel 14, 16, 21 in order to engage it with the latter and lift and lower the reel 14, 16, 21 itself, as described in detail hereinbelow.

In accordance with the idea underlying the present invention, each first tower 2 comprises a first guide seat 5 extended along a first substantially vertical movement direction Y'.

In addition, the apparatus 1 comprises two second towers 6 which are arranged parallel to and spaced from each other and are extended advantageously according to corresponding second vertical extension directions X".

Each second tower 6 is susceptible of being moved along the first guide seat 5 of the corresponding first tower 2 (as described in detail hereinbelow) and is provided with a second guide seat 7 extended along a second movement direction Y" parallel to the aforesaid first movement direction Y' of the first guide seat 5 itself.

In addition, the apparatus 1 comprises two hub-holder groups 8, each of which slidably constrained to the corresponding second guide seat 7 and carries, rotatably mounted thereon, the corresponding hub 3.

Figure 7:
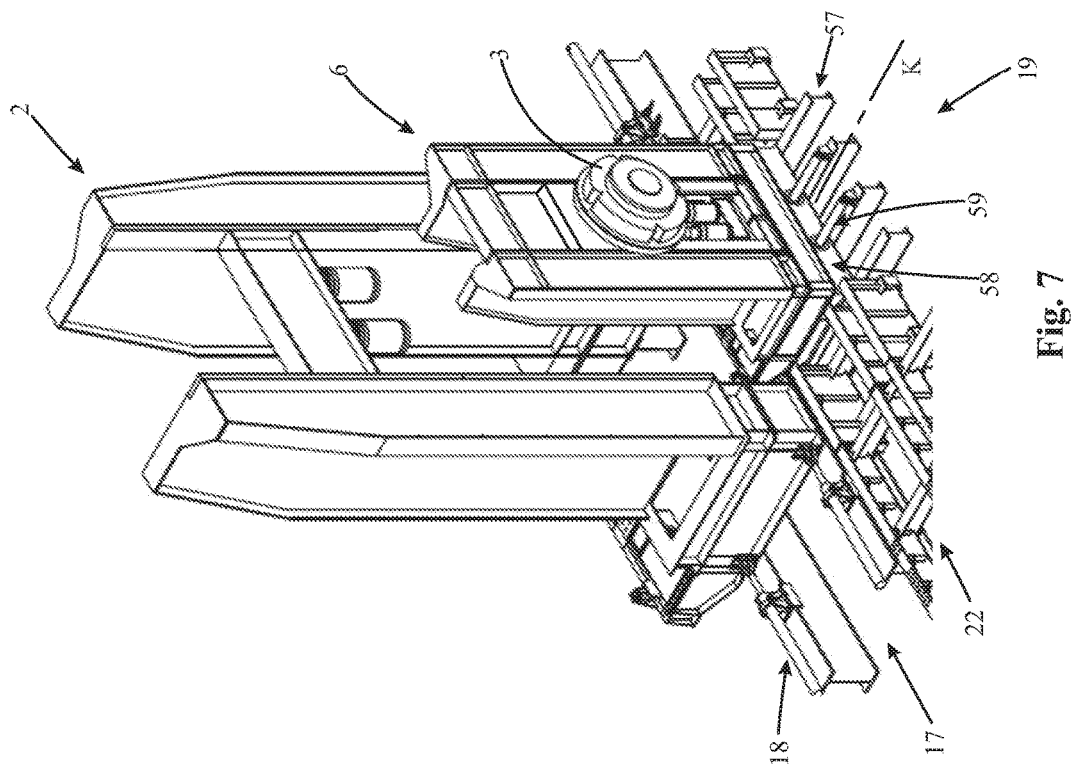
FIG. 7 shows a perspective view of the first and second tower of the present apparatus, in which second tower is separated from the first tower.
Figure 6:
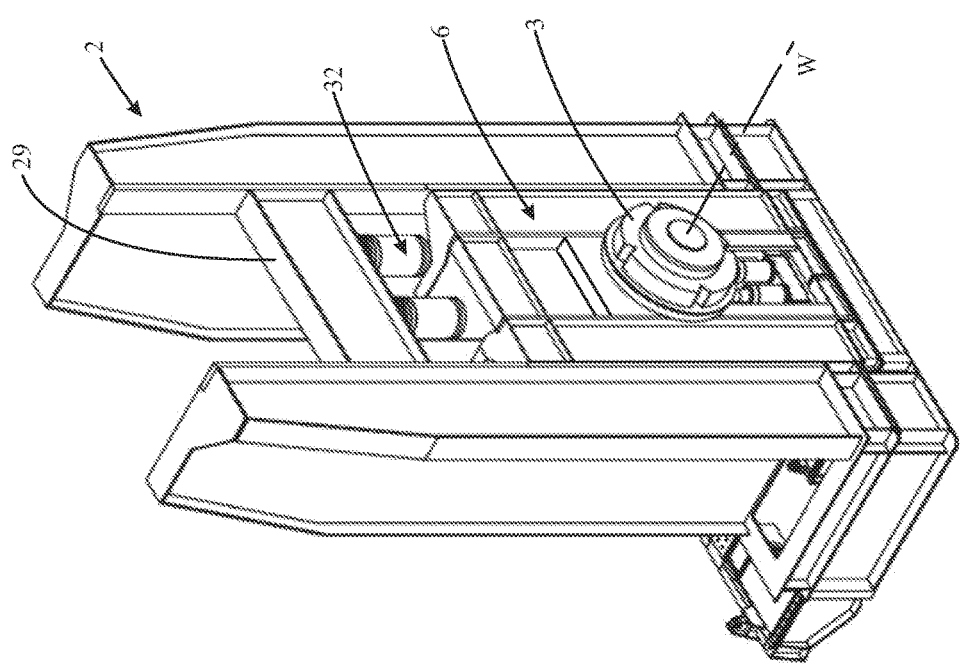
FIG. 6 shows a perspective view of the first and second tower of the present apparatus, in which the second tower is arranged in lowered position with first displacement actuators disconnected from the second tower.

Advantageously, with reference to FIGS. 9 and 10, each hub-holder group 8 comprises a support body 9, preferably metallic with box-like shape, for example substantially with parallelepiped form, which centrally carries the hub 3, rotatably mounted thereon. In particular, the hub 3 has the form of a cylindrical body peripherally provided with notches adapted to be coupled in corresponding teeth made on the internal profile of a connection flange (of type per se known to the man skilled in the art), fixed to the end of the drum 14', 16', 21' of the reel 14, 16, 21, in order to transmit rotation motion to the reel for the unwinding of the corresponding cable. At least one motor 10 (and preferably two motors 10) is also mounted on the support body 9 of the hub-holder group 8, such motor 10 for example of electric or hydraulic type and mechanically connected to the hub 3 in order to rotate the latter and the reel 14, 16, 21 therewith. According to the invention, the apparatus 1 comprises translation elements 19, which are arranged for moving each second tower 6 between a first operating configuration, in which the second tower 6 is slidably constrained in the first guide, seat 5 of the corresponding first tower 2 (as illustrated in the embodiments of FIGS. 4-6), and a second operating configuration, in which the second tower 6 is arranged outside the first guide seat 5 of the corresponding first tower 2 (as illustrated in the embodiment of FIG. 7).

In addition, the movement elements of the apparatus 1 comprise a first movement system 11 mechanically connected to the second towers 6 and arranged for moving each second tower 6 (arranged in the aforesaid first operating configuration) into the corresponding first guide seat 5 along the aforesaid first movement direction Y', in particular in order to engage the hubs 3 with large-size reels (for example with diameter of 24 meters), as described hereinbelow.

In addition, the movement elements comprise a second movement system 12 mechanically connected to the hub-holder groups 8 and arranged for moving each hub-holder group 8 into the corresponding second guide seat 7 of the corresponding second tower 6 along the aforesaid second movement direction Y'', in particular in order to engage the hubs 3 with reels of relatively limited size (for example with diameter of 12 meters), as described hereinbelow.

In particular, the second movement system 12 is arranged for moving the hub-holder groups 8 when the corresponding second towers 6 are arranged in the aforesaid second operating configuration.

Figure 1:
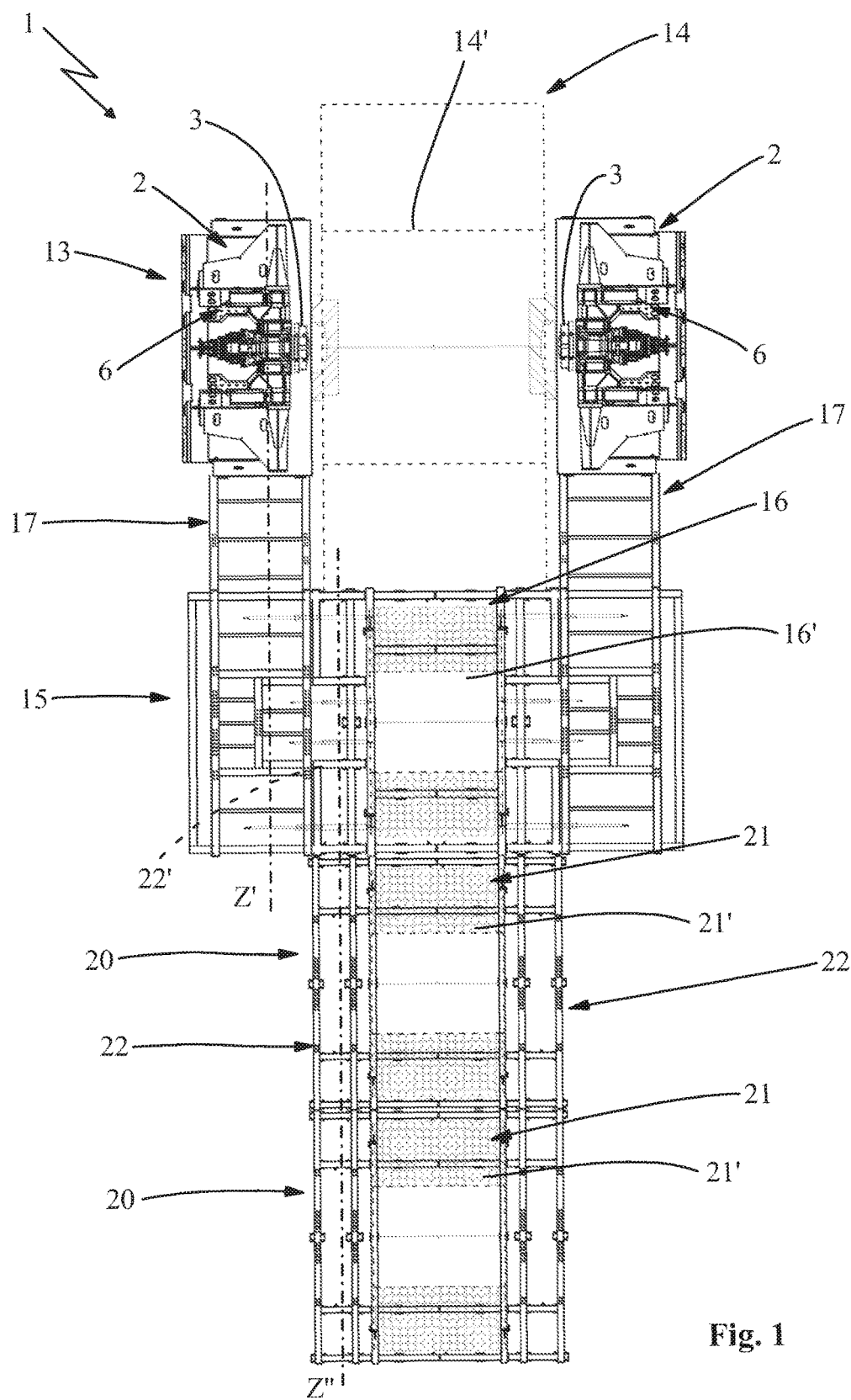
FIG. 1 shows a top plan view of the apparatus, object of the present invention.
Figure 2:
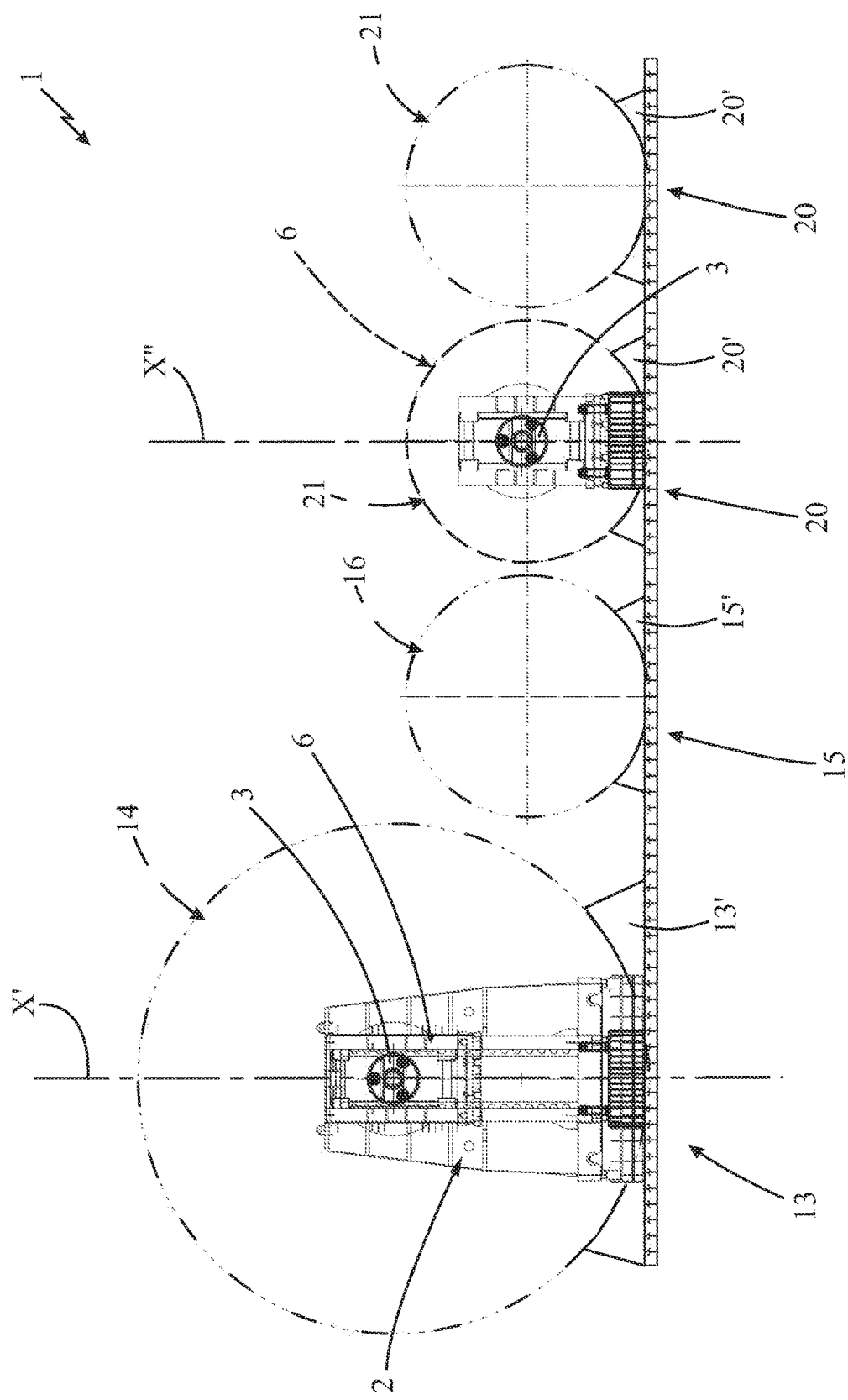
FIG. 2 shows a side view of the apparatus, object of present invention, in which in particular a first tower is illustrated, and a second tower which is represented in two different operating positions.

Advantageously, with reference to the embodiment illustrated in FIGS. 1 and 2, the apparatus 1 comprises a first station 13 provided with a first abutment seat 13' (illustrated in a schematized manner in FIG. 2) in which a first reel 14 is intended to be arranged, provided with a first drum 14' around which a first cable is wound. In particular, such first cable can for example be constituted by a cable made of yielded steel intended to be employed for example for injecting compressed air or water into an oil well.

Suitably, the aforesaid first reel 14 has size and weight that are relative high, for example having a diameter of about 24 meters and a weight of about 2400 tons.

In operation, in order to unwind the first cable of the first reel 14, the latter is intended to be arranged between the two first towers 2 so as to be engaged with the hubs 3 of the apparatus 1, as described in detail hereinbelow.

The present apparatus 1 comprises a second station 15 provided with a second abutment seat 15' (illustrated in a schematized manner in FIG. 2) in which a second reel 16 is intended to be arranged, provided with a second drum 16' around which a second cable is wound. In particular, such second cable can for example be constituted by a flexible cable intended for various applications, such as an energy transmission cable, a data transmission signal cable (e.g. made of optical fiber), a flexible tube and more generally a flexible umbilical cord.

Suitably, the aforesaid second reel 16 has lower size and weight than the aforesaid first reel 14, for example having a diameter of about 5-12 meters and a weight of about 250-300 tons.

In operation, in order to unwind the second cable of the second reel 16, the latter is intended to be arranged between the second towers 6 in order to be engaged with the hubs 3 of the apparatus 1, as described in detail hereinbelow.

Advantageously, the first and the second abutment seats 13' 15' respectively of the first and of the second stations 13, 15 comprise a corresponding metalwork support saddle against which the corresponding reel 14, 16 is intended to be abutted.

The present apparatus 1 also comprises two first longitudinal tracks 17, which are arranged parallel to each other and are extended at least between the first station 13 and the second station 15. On each of such first longitudinal track 17, the corresponding first tower 2 is slidably arranged in order to allow the movement of the latter between the first station 13 and the second station 15.

For such purpose, the apparatus 1 comprises first movement elements 18 (illustrated in detail in the embodiments of FIGS. 4-7), which are mechanically connected to the first towers 2 and, when the second towers 6 are in their first operating configuration, such first movement elements 18 are arranged for moving the first towers 2 along the corresponding first longitudinal track 17 between the first station 13 and the second station 15.

In particular, when the first towers 2 (together with the second towers 6 arranged in the first operating configuration) are in the first station 13, the hubs 3 are susceptible of being engaged with the first drum 14' of the first reel 14. When the second towers 6 are in the second station 15 arranged in the aforesaid second operating configuration, the hubs are susceptible of being engaged with the second drum 16' of the second reel 16.

Advantageously, the first movement system 11 is arranged for moving the corresponding second tower 6, arranged in the first operating configuration, along the corresponding first movement direction Y' between at least one raised position, in which the second tower 6 is at least partially lifted from corresponding first longitudinal track 17 (as illustrated in the embodiment of FIG. 4), and a lowered position, in which the second tower (6) is placed in abutment against the corresponding first longitudinal track 17 (as illustrated in the embodiments of FIGS. 5 and 6). Preferably, the second tower 6 in the raised position can be positioned at multiple different heights as a function, in particular, of the size of the reels and of the operating steps actuated by the apparatus 1.

Advantageously, the apparatus 1 comprises a third station 20 provided with a third abutment seat 20' in which a third reel 21 is intended to be arranged, provided with a third drum 21' around which a third cable is wound. In particular, such third cable can be constituted by a flexible cable, for example of the types indicated above for the second cable of the second reel 16. Suitably, the third reel 21 has lower size and weight than the aforesaid first reel 14, for example having a diameter of about 5-12 meters and a weight of about 250-300 tons.

In operation, in order to unwind the third cable of the third reel 21, the latter is intended to be arranged between the second towers 6 so as to be engaged with the hubs 3 of the apparatus 1, as described in detail hereinbelow.

The apparatus 1 comprises two second longitudinal tracks 22, which are arranged parallel to each other and are extended at least between the second station 15 and the third station 20. Preferably, the apparatus 1 comprises multiple third stations 20 (e.g two), as illustrated in the embodiment illustrated in FIGS. 1 and 2, connected to each other by the second longitudinal track 22. Otherwise, in accordance with a non-illustrated embodiment, the apparatus 1 comprises only one third station 20.

Advantageously, the aforesaid translation elements 19 are arranged at the second station 15 of the apparatus 1 and, when the first towers 2 are arranged in the second station 15 itself, the translation elements 19 are arranged for moving each second tower 6 between the first operating configuration, in which the second tower 6 is arranged in the lowered position on the first longitudinal track 17, and the second operating configuration, in which the second tower 6 is arranged on the corresponding second longitudinal track 22.

In this manner, in particular, each second longitudinal track 22 slidably receives in abutment the corresponding second tower 6 when the latter is arranged in its aforesaid second operating configuration in order to move the second tower 6 between the second station 15 and the third station (s) 20.

Advantageously, the aforesaid second longitudinal track 22 are provided with corresponding overlapping sections 22' extended in the second station 15 and arranged between the first longitudinal track 17, in a manner such to allow each second tower 6 to be moved by the translation elements 19 between the first longitudinal track 17 (on which the corresponding first tower 2 is arranged) and the corresponding second longitudinal track 22.

The apparatus 1 comprises second movement elements 23 (illustrated in detail in the embodiment of FIGS. 11 and 12) which, when the second towers 6 are arranged in the second operating configuration on the corresponding second longitudinal track 22, are mechanically connected to the second towers 6 themselves and are arranged for moving the latter along the corresponding second longitudinal track 22 between the second station 15, in which the hubs 3 are susceptible of being engaged with the second drum 16' of the second reel 16, and the third station 20, in which the hubs 3 are susceptible of being engaged with the third drum 21' of the third reel 21.

Advantageously, the first and the second longitudinal tracks 17, 22 are extended parallel to each other according to corresponding first and second longitudinal directions Z', Z", preferably rectilinear.

In particular, each first and second longitudinal track 17, 22 is obtained respectively with a first and a second metal framework comprising in particular at least two corresponding longitudinal members connected together by multiple corresponding reinforcement crosspieces. Advantageously, in accordance with the embodiment illustrated in FIGS. 3-6, each first tower 2 comprises a first base 70 abutted against the corresponding first longitudinal track 17 and two first columns 24, which are arranged in abutment against such first base 70, are positioned parallel to and spaced from each other, and together define the corresponding first guide seat 5 in which the corresponding second tower 6 is susceptible of being inserted.

Preferably, the first base 70 of each first tower 2 comprises a first base-part 25 arranged in abutment against the corresponding first longitudinal track 17, and a first base block 26 slidably abutted on top of the first base-part 25 and carrying the two corresponding first columns 24 fixed thereto.

Advantageously, the apparatus 1 comprises first connection actuators 27 mechanically connected to the corresponding first towers 2 and arranged for moving the latter towards or away from each other (according to a direction parallel to the rotation axis W of the hubs 3), in order to respectively bring the hubs 3 to engage or disengage the first drum 14' of the first reel 14. Preferably, the aforesaid first connection actuators 27, in particular obtained with first hydraulic cylinders, are advantageously arranged parallel to the rotation axis W of the hubs 3 and operate on the first base block 26 of the first base 70 in order to integrally move the first columns 24, the second tower 6 and the second hub-holder group 8 associated with the corresponding first tower 2, in a manner such to move the corresponding hub 3 for engaging or disengaging the first drum 14' of the first reel 14.

In particular, each first connection actuator 27 comprises a first reaction end engaged with the first base-part 25 and a first action end engaged with the first base block 26, and is drivable in extension and retraction in order to move the base block 26 itself.

Advantageously, with reference to the embodiment of FIG. 3, the first movement system 11 (arranged for moving the second towers 6 in the corresponding first guide seat 5) comprises, for each second tower 6: first anchorage elements 28, a first reaction bar 29, first and second locking devices 30, 31 and at least one first movement actuator 32, as specifically discussed hereinbelow.

More in detail, the first movement system 11 comprises a plurality of first anchorage elements 28 arranged on the corresponding first tower 2 and aligned in sequence along the first movement direction Y' of the first guide seat 5.

The first movement system 11 also comprises a first reaction bar 29 slidably and mechanically guided in the first guide seat 5 of the corresponding first tower 2 in order to be moved along the aforesaid first movement direction Y'.

In addition, the first movement system 11 comprises at least one first locking device 30 mounted on the corresponding second tower 6 and drivable to be moved between a first interference position, in which the first locking device 30 intercepts at least one of the first anchorage elements 28 of the corresponding first tower 2, constraining the second tower 6 to the first tower 2 itself with respect to movements along the first movement direction Y', and a first non-interference position, in which the first locking device 30 is released from the first anchorage elements 28, freeing the second tower 6 from the first tower 2 in order to allow movements of the second tower 6 along the first slide direction Y'.

The first movement system 11 also comprises at least one second locking device 31 mounted on the corresponding first reaction bar 29, and drivable to be moved between a second interference position, in which the second locking device 31 intercepts at least one of the first anchorage elements 28 of the first tower 2, constraining the first reaction bar 29 to the first tower 2 itself with respect to movements along the first slide direction Y', and a second non-interference position, in which the second locking device 31 is released from the first anchorage elements 28, freeing the first reaction bar 29 from the first tower 2 in order to allow movements of the first reaction bar 29 along the first movement direction Y'.

Advantageously, in accordance with the particular embodiment illustrated in FIG. 3, the first movement system 11 comprises multiple aforesaid first locking devices 30 (e.g. four) and comprises preferably multiple second locking devices 31 (e.g. two).

Suitably, the first movement system 11 comprises two first rows of the first anchorage elements 28, and each of such first rows is in particular arranged on the corresponding first column 24 of the first tower 2.

The first anchorage elements 28 of each first row are susceptible of being engaged by at least one of the aforesaid first locking devices 30 (e.g. two) and by at least one of the second locking devices 31.

The first movement system 11 also comprises at least one first movement actuator 32 mounted between the corresponding second tower 6 and the corresponding first reaction bar 29, in order to selectively modify the distance between the latter:

when the first locking device 30 is in the first interference position and the second locking device 31 is in the second non-interference position, so as to allow the movement of the first reaction bar 29 (carrying the second locking device 31 mounted thereon), or when the first locking device 30 is in the first non-interference position and the second locking device 31 is in the second interference position, so as to allow the movement of the second tower 6 (carrying the first locking device 30 mounted thereon).

Preferably, the first movement actuator 32 is arranged inside the first guide seat 5 of the corresponding first tower 2 and is positioned in particular between the two first columns 24 of the first tower 2 itself.

Suitably, the first movement actuator 32 is fixed to the second tower 6 by means of removable fixing elements (not illustrated in the enclosed figures) comprising for example a perforated plate, which is fixed to the first movement actuator 32, is inserted between two eyebolts fixed to the second tower 6 and is connected to the latter by means of a connection pin inserted in the eyebolts and in the holes of the perforated plate.

In this manner, it is possible to disconnect the first movement actuator 32 from the second tower 6 in order to allow the latter to be moved between the first and the second longitudinal tracks 17, 22 when the first tower 2 is arranged in the second station 15 of the apparatus 1, as illustrated in the embodiments illustrated in FIGS. 6 and 7.

Advantageously, in order to balance the stresses, the first movement system 11 comprises two aforesaid first movement actuators 32 that are parallel to each other, in accordance with the particular embodiment illustrated in FIGS. 3-7.

The first movement actuator 32 is drivable to be extended in order to move the second tower 6 and the first reaction bar 29 away from each other and it is drivable to be shortened in order to move the second tower 6 and the first reaction bar 29 towards each other. Of course, as indicated above, in order to allow each first movement actuator 32 to be extended or shortened, one from between the second tower 6 and the first reaction bar 29 must be released from the first tower 2 (by arranging the corresponding locking device 30, 31 into the corresponding non-interference position) so to be able to slide along the first movement direction Y', while the other from between the second tower 6 and the first reaction bar 29 must be constrained to the first tower 2 (by arranging the corresponding locking device 30, 31 in the corresponding interference position) in order to allow the reaction of the first movement actuator 32, unloading the force on the first tower 2.

Advantageously, the movement of the second tower 6 or of the first reaction bar 29, produced by the first movement actuators 32, corresponds with a first predefined distance that separates (according to the first movement direction Y') two of the first anchorage elements 28 and in particular it is equal to the section that separates two first anchorage elements 28 in succession (according to the first movement direction Y'). In this manner, the first and second locking devices 30, 31 are capable of mechanically constraining to the first tower 2 respectively the second tower 6 and the first reaction bar 29, after respectively the second tower 6 or the first reaction bar 29 has reached the new position displaced by the aforesaid first distance predefined along the first movement direction Y'.

In this manner, it is possible to alternately move the second tower 6 and the first reaction bar 29 with successive travel sections according to the first movement direction Y'.

In operation, in order to move the second tower 6 in a first sense (e.g. upward) of the first movement direction Y', the following operating steps are provided for; it is assumed that one starts from a configuration in which the first movement actuator 32 is shortened and the first and second locking devices 30, 31 are in the corresponding interference positions:

driving the second locking devices 31 to be moved into the second non-interference position thereof, in a manner such to release the first reaction bar 29 from the corresponding first tower 2;

driving the first movement actuator 32 to be extended in order to move the first reaction bar 29 along the first guide seat 5 by the aforesaid first predefined distance;

driving the second locking devices 31 to be moved into the second interference position thereof, in a manner such to constrain the first reaction bar 29 to the corresponding first tower 2;

driving the first locking devices 30 to be moved into the first non-interference position thereof, in a manner such to release the second tower 6 from the corresponding first tower 2;

driving the first movement actuator 32 to be shortened in order to move the second tower 6 by the aforesaid first predefined distance towards the first reaction bar 29 along the first guide seat 5;

driving the first locking devices 30 to be moved into their first interference position, in a manner such to constrain the second tower 6 to the first tower 2.

The above-indicated operating steps are advantageously repeated until the second tower 6 (and the hub 3) is brought to the desired height.

Analogous operating steps are provided for moving the second tower 6 in a second sense (e.g. downward) of the first movement direction Y', which are clearly derivable by the man skilled in the art from the description of the aforesaid operating steps for moving the second tower 6 in the first sense of the first movement direction Y'.

In accordance with the embodiment illustrated in the enclosed figures, the first reaction bar 29 is arranged above the second tower 6.

In accordance with a different embodiment not illustrated in the enclosed figures, the first reaction bar 29 is arranged below the second tower 6, in this case providing for operating steps for moving the second tower 6 that are analogous to those described above and derivable by the man skilled in the art on the basis of that reported above.

In accordance with a preferred embodiment of the present invention, the first anchorage elements 28 are constituted by a plurality of first holes 28' made on the corresponding first tower 2.

Preferably, the first anchorage elements 28 are spaced one from the next (according to the first movement direction Y') with a specific first pitch, preferably constant.

Preferably, the first movement system 11 comprises two first guides fixed to the corresponding first columns 24 of the corresponding first tower 2 and arranged counter-facing each other, and in such first guides the corresponding second tower 6 is slidably engaged. In addition, the first movement system 11 comprises two second guides fixed to the corresponding first columns 24 and in which the corresponding first reaction bar 29 is slidably engaged.

Advantageously, with reference to the embodiment illustrated in FIG. 3, the aforesaid first and second guide fixed to each first column 24 are both obtained with a single corresponding first projecting wall 33 projectingly extended from the corresponding first column 24 to the interior of the corresponding first guide seat 5.

Such first projecting wall 33 advantageously carries, associated therewith, the aforesaid plurality of first anchorage elements 28, as stated preferably constituted by the first holes 28'.

Preferably, the first movement system 11 comprises multiple first plates 34 (e.g. four) laterally and projectingly fixed to the second tower 6 and multiple parallel second plates 35 (e.g. two) laterally and projectingly fixed to the first reaction bar 29, such first and second plates 34, 35 are arranged in order to be slidably guided on the corresponding first projecting walls 33 fixed to the corresponding first columns 24, being in particular arranged parallel in abutment against the corresponding first projecting walls 33.

Advantageously, the first locking device 30 of the first movement system 11 comprises a first actuator, which is provided with a first jacket, made integral respectively with the second tower 6 by means of for example a first connection flange, and with a first movable stem carrying, associated therewith, a first stop element drivable to project towards the first tower 2 in order to interfere with the first anchorage elements 28 when the first locking device 30 is driven to be moved into the first interference position.

Analogously, the second locking device 31 of the first movement system 11 comprises a second actuator, which is provided with a second jacket, made integral respectively with the first reaction bar 29 by means of for example a second connection flange, and with a second movable stem carrying, associated therewith, a second stop element drivable to project towards the first tower 2 in order to interfere with the first anchorage elements 28 when the second locking device 31 is driven to be moved into the second interference position.

Preferably, each first and second actuator is obtained with a corresponding cylinder with through stem, whose end portion acts as a stop element.

Advantageously, with reference to FIGS. 4-8, the first movement elements 18 (arranged for moving the corresponding first tower 2 along the corresponding first longitudinal track 17) advantageously comprise one or more first displacement actuators 36, preferably of linear type, in particular obtained by means of first hydraulic cylinders.

In particular, each first displacement actuator 36 is provided with two first elongated components 37, 38 movable in mutual extension and retraction.

With reference to the particular embodiment illustrated in FIGS. 4-8, such first elongated components 37, 38 comprise a first reaction component 37 constrained to the corresponding first longitudinal track 17 and a first action component 38 constrained to the first tower 2, and in particular to the first base-part 25 of the first tower 2 itself.

Of course, without departing from the protective scope of the present invention and in an entirely equivalent manner, the first reaction component 37 can be constrained to the first tower 2 and the first action component 38 can be constrained to the corresponding first longitudinal track 17. Preferably, the first reaction component 37 comprises a first hollow jacket and the first action component 38 comprises a first piston inserted in the aforesaid first hollow jacket.

Preferably, the first reaction component 37 is removably constrained to the first longitudinal track 17 by means of a first coupling mechanism 39, which is fixed to the aforesaid first reaction component 37 and is removably engaged with the corresponding first longitudinal track 17, for example by means of first pins constrainable to corresponding second seat made in the first longitudinal track 17 itself.

In operation, in order to move each first tower 2 along the corresponding first longitudinal track 17, the first displacement actuator 36 is driven to operate according to the following operating steps, assuming that such first displacement actuator 36 operates via traction on the first tower 2 and starting from a configuration in which the first displacement actuator 36 is retracted and the first coupling mechanism 39 is constrained to the first longitudinal track 17:

releasing the first coupling mechanism 39 from the first longitudinal track 17;

driving the first displacement actuator 36 in extension, in a manner such to move the first reaction component 37 along the first longitudinal track 17 away from the first tower 2;

newly constraining the first coupling mechanism 39 to the first longitudinal track 17;

driving the first displacement actuator 36 in retraction, in a manner such to draw the first tower 2 towards the first reaction component 37, making the first tower 2 itself advance along the first longitudinal track 17.

The above-described operating steps are advantageously repeated until the first tower 2 is brought into the desired position along the first longitudinal track (e.g. at the first station 13 or at the second station 15 of the apparatus 1).

Analogous operating steps are provided if the first displacement actuator 36 operates by thrusting against the first tower 2, which are clearly derivable by the man skilled in the art from the description of the aforesaid operating steps in which the first displacement actuator 36 operates via traction on the first tower 2.

Advantageously, in accordance with the embodiment illustrated in FIGS. 9 and 10, each second tower 6 comprises a second base 40 intended to be abutted, when the second tower 6 is in the aforesaid second operating configuration, against the corresponding second longitudinal track 22. In addition, each second tower 6 comprises two second columns 41, which are arranged in abutment against the second base 40, are positioned parallel to and spaced from each other and together define the corresponding second guide seat 7 in which the corresponding hub-holder group 8 is inserted.

Preferably, the second base 40 of each second tower 6 comprises a second base-part 42 intended to be arranged in abutment against the corresponding second longitudinal track 22 when the second tower 6 is in the aforesaid second operating configuration, and a second base block 43 slidably abutted on top of the second base-part 42 and carrying the two corresponding second columns 41 fixed thereto.

Advantageously, when the second tower 6 is in its raised position, at least part of the second base 40 (in particular the second base-part 42) remains abutted against the first longitudinal track 17, the second columns 41 preferably being lifted together with the second base block 43. More generally, each second tower 6 is considered arranged in the raised position when the parts are lifted of such second tower 6 carrying the corresponding hub-holder group 8 constrained thereto, such as the second columns 41 of the second tower 6.

Advantageously, the apparatus 1 comprises second connection actuators 44 mechanically connected to the corresponding second towers 6 and arranged for moving the latter towards or away from each other (according to a direction parallel to the rotation axis W of the hubs 3), in order respectively to bring the hubs 3 to engage or disengage the second or third drum 16', 21' respectively of the second or third reel 16, 21.

Preferably, the aforesaid second connection actuators 44, in particular obtained with second hydraulic cylinders, are advantageously arranged parallel to the rotation axis W of the hubs 3 and operate on the second base block 43 of the second base 40 in order to integrally move the corresponding second columns 41 and the corresponding hub-holder group 8, in a manner such to move the corresponding hub 3 such that it engages or disengages the second or third drum 16' 21' respectively of the second or third reel 16, 21.

Figure 11:
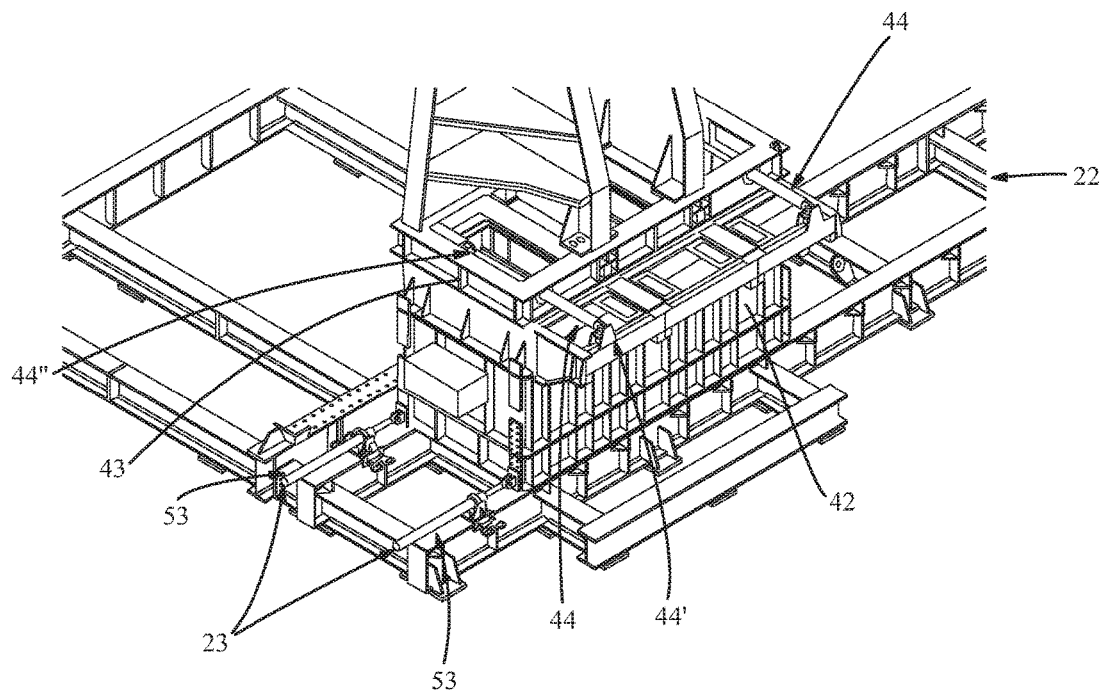
FIG. 11 shows a detail of the second tower relative to a lower part of the second tower itself.

In particular, with reference to the embodiment of FIG. 11, each second connection actuator 44 comprises a second reaction end 44' engaged with the second base-part 42 and a second action end 44" engaged with the corresponding second base block 43, and it is drivable in extension and in retraction in order to move the second base block 43 itself.

Preferably, when each second tower 6 (arranged in its first operating configuration must be brought into the raised position, the second connection actuators 44 are separated from the second base-part 42 and/or from the second base block 43 (in particular they can also be removed) in order to allow the movement of the second tower 6 in the first guide seat 5 of the corresponding first tower 2.

Advantageously, the second movement system 12 (arranged for moving the hub-holder groups 8 in the second guide seat 7) has a configuration substantially analogous to those of the first movement system 11 that is described above in detail.

In particular, with reference to the embodiments illustrated in FIGS. 9 and 10, the second movement system 12 comprises, for each hub-holder group 8: second anchorage elements 45, a second reaction bar 46, third and fourth locking devices 47, 48 and at least one second movement actuator 49, as specifically discussed hereinbelow.

More in detail, the second movement system 12 comprises a plurality of second anchorage elements 45 arranged on the corresponding second tower 6 and aligned in sequence along the second movement direction Y" of the second guide seat 7.

The second movement system 12 also comprises a second reaction bar 46 slidably and mechanically guided in the second guide seat 7 of the corresponding second tower 6 in order to be moved along the aforesaid second movement direction Y".

In addition, the second movement system 12 comprises at least one third locking device 47 mounted on the corresponding hub-holder group 8 and drivable to be moved between a third interference position C, in which the third locking device 47 intercepts at least one of the second anchorage elements 45 of the corresponding second tower 6, constraining the hub-holder group 8 to the second tower 6 itself with respect to movements along the second movement direction Y", and a third non-interference position C', in which such third locking device 47 is released from the second anchorage elements 45, freeing the hub-holder group 8 from the second tower 6 in order to allow movements of the hub-holder group 8 along the second movement direction Y".

The second movement system 12 also comprises at least one fourth locking device 48 mounted on the corresponding second reaction bar 46, and drivable to be moved between a fourth interference position D, in which the fourth locking device 48 intercepts at least one of the second anchorage elements 45 of the second tower 6, constraining the second reaction bar 46 to the second tower 6 itself with respect to movements along the second movement direction Y", and a fourth non-interference position D', in which the fourth locking device 48 is released from the second anchorage elements 45, freeing the second reaction bar 46 from the second tower 6 in order to allow movements of the second reaction bar 46 along the second movement direction Y".

Advantageously, in accordance with the particular embodiment illustrated in FIGS. 9 and 10, the second movement system 12 comprises multiple aforesaid third locking devices 47 (e.g. four) and preferably comprises multiple fourth locking devices 48 (e.g. two).

Suitably, the second movement system 12 comprises two second rows of second anchorage elements 45, and each of such second rows is in particular arranged on the corresponding second column 41 of the second tower 6.

The second anchorage elements 45 of each second row are susceptible of being engaged by at least one corresponding locking device of the aforesaid third locking devices 47 (e.g. two) and by at least one corresponding locking device of the aforesaid fourth locking devices 48.

The second movement system 12 also comprises at least one second movement actuator 49 mounted between the corresponding hub-holder group 8 and the corresponding second reaction bar 46, in order to selectively modify the distance between the latter:

when the third locking device 47 is in the third interference position C and the fourth locking device 48 is in the fourth non-interference position D', so as to allow the movement of the second reaction bar 46 (carrying the fourth locking device 48 mounted thereon), or when the third locking device 47 is in the third non-interference position C' and the fourth locking device 48 is in the fourth interference position D, so as to allow the movement of the hub-holder group 8 (carrying the third locking device 47 mounted thereon).

Preferably, the second movement actuator 49 is arranged inside the second guide seat 7 of the corresponding second tower 6 and is positioned in particular between the two second columns 41 of the second tower 6 itself.

Advantageously, in order to balance the stresses, the second movement system 12 comprises two aforesaid second movement actuators 49 that are parallel to each other, in accordance with the particular embodiment illustrated in FIGS. 9 and 10.

The second movement actuator 49 is drivable to be extended in order to move the hub-holder group 8 and the second reaction bar 46 away from each other and is drivable to be shortened in order to move the hub-holder group 8 and the second reaction bar 46 themselves towards each other. Of course, as indicated above, in order to allow each second movement actuator 49 to be extended or shortened, at least one from between the hub-holder group 8 and the second reaction bar 46 must be released from the second tower 6 (arranging the corresponding locking device 47, 48 in the corresponding non-interference position C', D') so to be able to slide along the second movement direction Y", while the other between the hub-holder group 8 and the second reaction bar 46 must be constrained to the second tower 6 (arranging the corresponding locking device 47, 48 in the corresponding interference position C, D) in order to allow the reaction of the second movement actuator 49, unloading the force on the second tower 6.

Advantageously, the movement of the hub-holder group 8 or of the second reaction bar 46, produced by the second movement actuators 49, corresponds with a second predefined distance which separates (along the second movement direction Y") two of the second anchorage elements 45 and in particular is equal to a second section that separates two second anchorage elements 45 in succession (along the second movement direction Y"). In this manner, the third and fourth locking elements 47, 48 are capable of mechanically constraining to the second tower 6 respectively the hub-holder group 8 and the second reaction bar 46, after which respectively the hub-holder group 8 or the second reaction bar 46 have reached the new position displaced by the aforesaid second predefined distance along the second movement direction Y".

In this manner, it is possible to alternately move the hub-holder group 8 and the second reaction bar 46 with successive travel sections along the second movement direction Y".

Figure 13A:
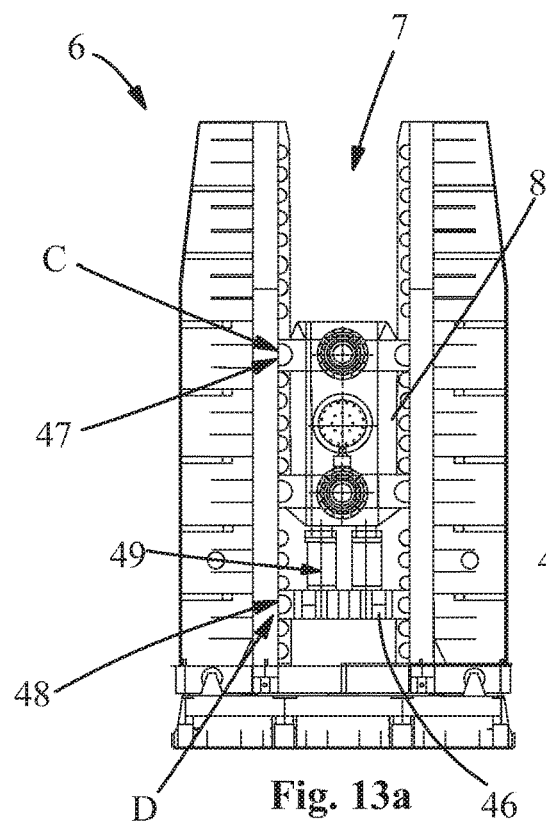
FIGS. 13a-13g show the second tower having a corresponding hub-holder group arranged in corresponding different operating configurations.
Figure 13B:
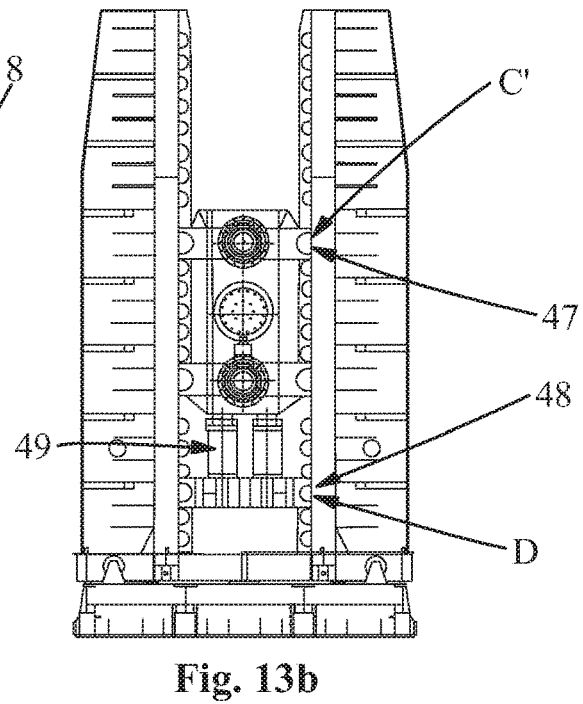
Figure 13C:
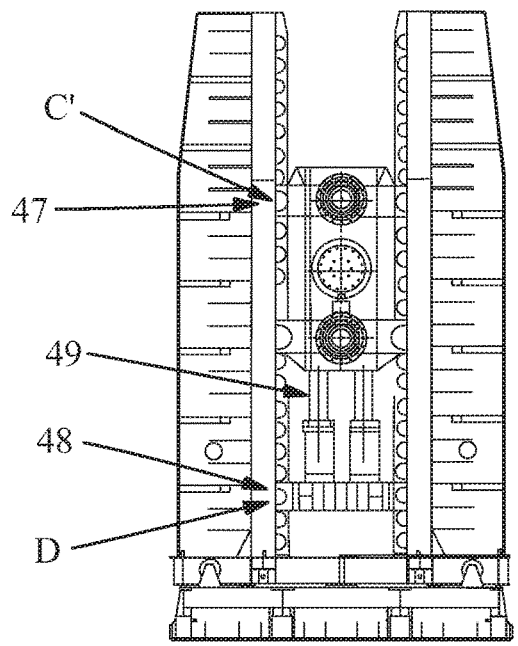
Figure 13D:
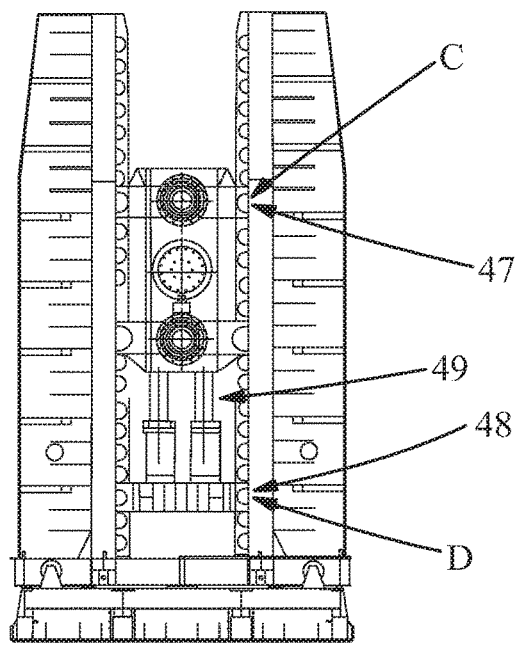
Figures 13E, 13F:
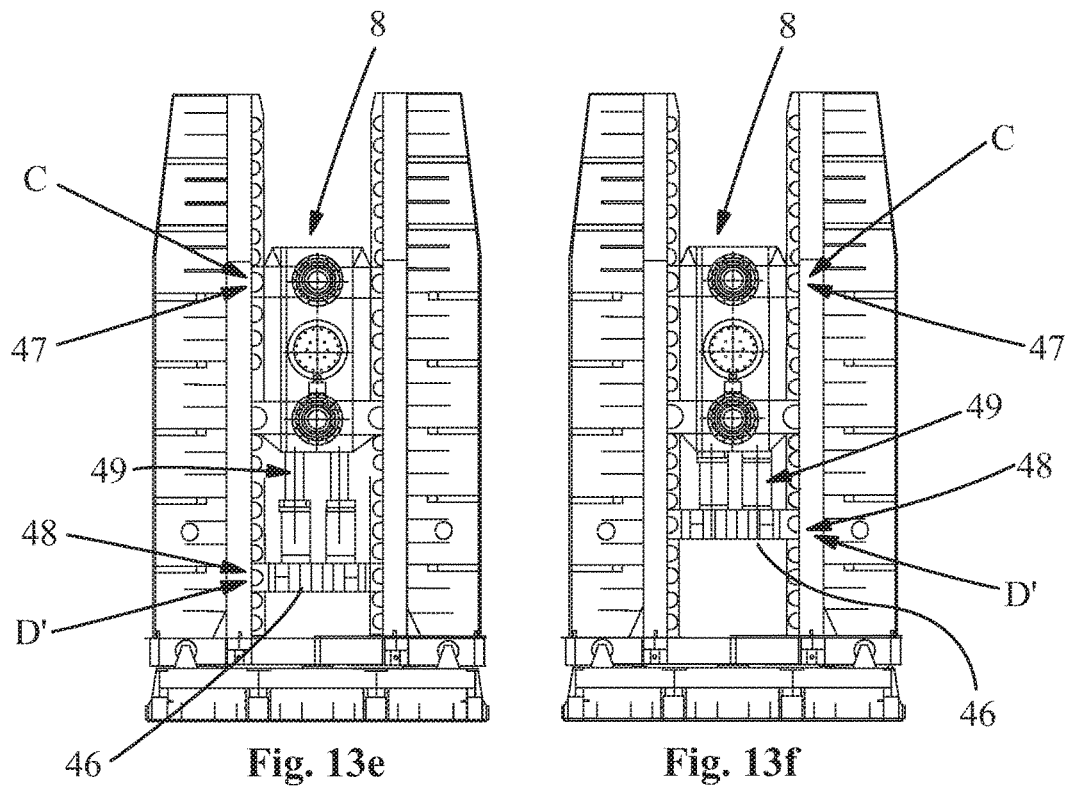
Figure 13G:
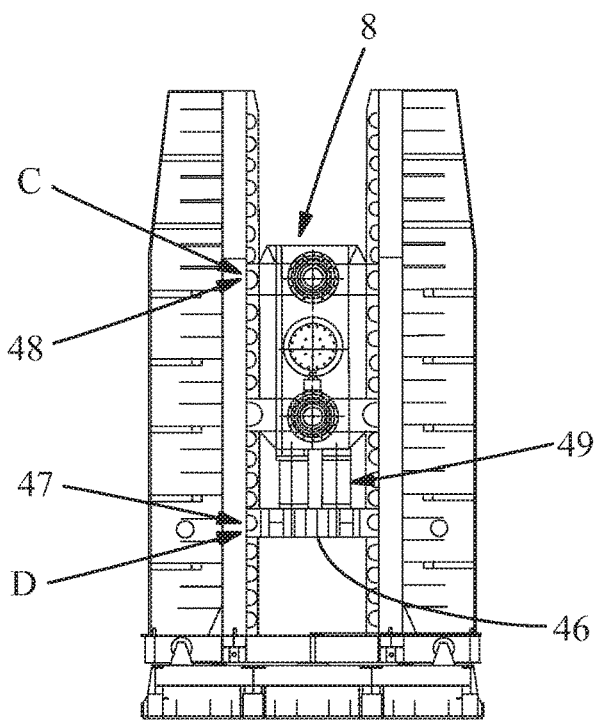

In operation, in order to move the hub-holder group 8 in a first sense (e.g. upward) of the second movement direction Y", the following operating steps are provided for (illustrated in detail in the embodiment of FIGS. 13a-13g); it is assumed that one starts from a configuration in which the second movement actuator 49 is shortened and the third and fourth locking devices 47, 48 are in the corresponding interference positions C, D (as illustrated in FIG. 13a):

driving the third locking devices 47 to be moved into the third non-interference position C' thereof in a manner such to release the hub-holder group 8 from the corresponding second tower 6 (as illustrated in FIG. 13b);

driving the second movement actuator 49 to be extended in order to move the hub-holder group 8 along the second guide seat 7 by the aforesaid second predefined distance (as illustrated in FIG. 13c);

driving the third locking devices 47 to be moved into the third interference position C thereof, in a manner such to constrain the hub-holder group 8 to the corresponding second tower 6 (as illustrated in FIG. 13d);

driving the fourth locking devices 48 to be moved into the fourth non-interference position D' thereof, in a manner such to release the second reaction bar 46 from the corresponding second tower 6 (as illustrated in FIG. 13e);

driving the second movement actuator 49 to be shortened to move the second reaction bar 46 by the aforesaid second predefined distance towards the hub-holder group 8 along the second guide seat 7 (as illustrated in FIG. 13f);

driving the fourth locking devices 48 to be moved into the fourth interference position D thereof, in a manner such to constrain the second reaction bar 46 to the corresponding second tower 6 (as illustrated in FIG. 13g).

The above-indicated operating steps are advantageously repeated until the hub 3 is brought to the desired height.

Analogous operating steps are provided for moving the hub-holder group 8 in a second sense (e.g. downward) of the second movement direction Y", which are clearly derivable by the man skilled in the art from the description of the aforesaid operating steps in order to move the hub-holder group 8 in the first sense of the second movement direction Y".

In accordance with the embodiment illustrated in FIGS. 9-13f, the second reaction bar 46 is arranged below the corresponding hub-holder group 8.

In accordance with a different embodiment that is not illustrated in the enclosed figures, the second reaction bar 46 is arranged above the corresponding hub-holder group 8, in this case providing for operating steps for moving the hub-holder group 8 analogous to those described above and derivable by the man skilled in the art on the basis of that reported above.

In accordance with a preferred embodiment of the present invention, the second anchorage elements 45 are constituted by a plurality of second holes 45' made on the corresponding second tower 6.

Preferably, the second anchorage elements 45 are spaced from each other, one from the next (according to the second movement direction Y") by a specific pitch, preferably constant, and advantageously on the order of 20-40 cm.

Preferably, the second movement system 12 comprises two third guides fixed to the corresponding second columns 41 of the second tower 6 and arranged counter-facing each other, and in such third guides the hub-holder group 8 is slidably engaged. In addition, the second movement system 12 comprises two fourth guides fixed to the corresponding second columns 41, in which the corresponding second reaction bar 46 is slidably engaged.

Advantageously, with reference to the embodiment illustrated in FIGS. 9 and 10, the aforesaid third and fourth guides are both obtained with a single second projecting wall 50 projectingly extended from the corresponding second column 41 to the interior of the corresponding second guide seat 7. Such second projecting wall 50 advantageously carries, associated therewith, the aforesaid plurality of second anchorage elements 45 preferably constituted, as stated, by the second holes 45'.

Preferably, the second movement system 12 comprises multiple third plates 51 laterally and projectingly fixed to the support body 9 of the hub-holder group 8 and multiple parallel fourth plates 52 laterally and projectingly fixed to the second reaction bar 46, and such third and fourth plates 51, 52 are arranged for being slidably guided on the corresponding second projecting walls 50 fixed to the corresponding second columns 41.

Advantageously, the third locking device 47 of the second movement system 12 comprises a third actuator which is provided with a third jacket, made integral respectively with the hub-holder group 8 by means of for example a third connection flange, and with a third movable stem carrying, associated therewith, a third stop element drivable to project towards the second tower 6 in order to interfere with the second anchorage elements 45 when the third locking device 47 is driven to be moved into the third interference position C.

Analogously, the fourth locking device 48 of the second movement system 12 comprises a fourth actuator which is provided with a fourth jacket, made integral respectively with the second reaction bar 46 by means of for example a fourth connection flange, and with a fourth movable stem carrying, associated therewith, a fourth stop element drivable to project towards the second tower 6 in order to interfere with the second anchorage elements 45 when the fourth locking device 48 is driven to be moved into the fourth interference position D.

Preferably, each third and fourth actuator is obtained with a corresponding cylinder with through stem, whose end portion acts as a stop element.

Figure 12:
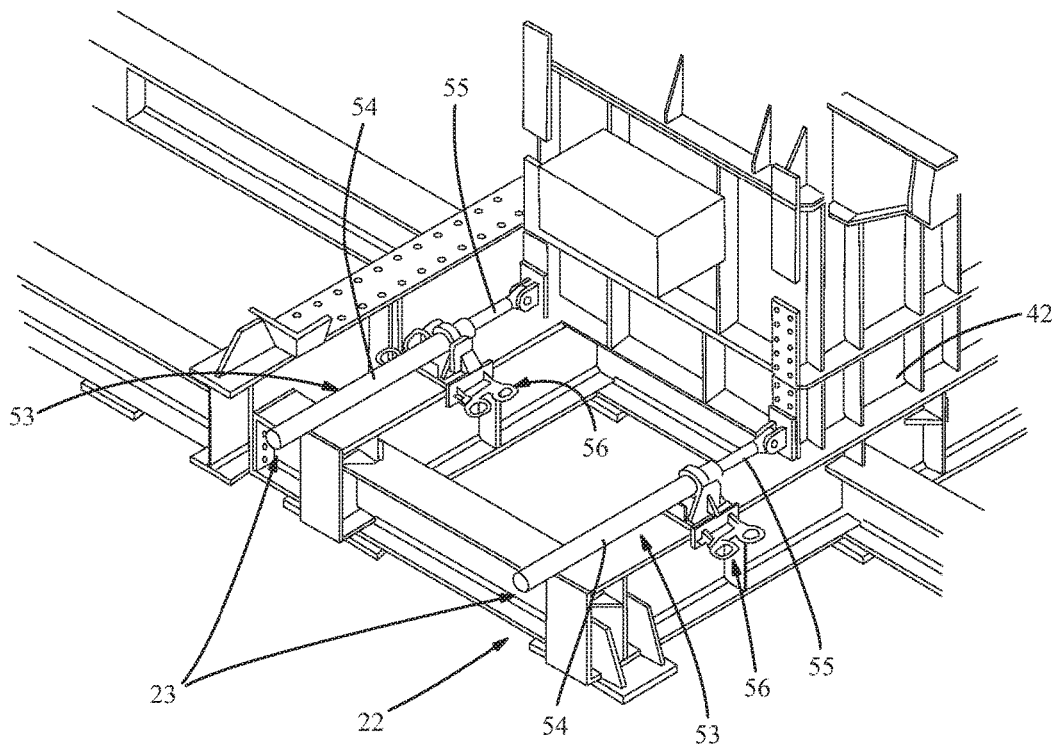
FIG. 12 shows a further detail of the second tower illustrated in FIG. 11.

Advantageously, in accordance with the embodiments of FIGS. 11 and 12, the second movement elements 23 (arranged for moving the corresponding second tower 6 along the corresponding second longitudinal track 22) comprise one or more second displacement actuators 53, preferably of linear type, obtained in particular by means of second hydraulic cylinders.

In particular, each second displacement actuator 53 is provided with two second elongated components 54, 55 movable in extension and in retraction with respect to each other.

With reference to the particular embodiment illustrated in FIG. 12, such second elongated components 54, 55 comprise a second reaction component 54 constrained to the corresponding second longitudinal track 22 and a second action component 55 constrained to the second tower 6, and in particular to the second base-part 42 of the second tower 6 itself.

Of course, without departing from the protective scope of the present invention and in an entirely equivalent manner, the second reaction component 54 can be constrained to the second tower 6 and the second action component 55 can be constrained to the second longitudinal track 22. Preferably, the second reaction component 54 comprises a second hollow jacket and the second action component 55 comprises a second piston inserted in the aforesaid second hollow jacket. Preferably, the second reaction component 54 is removably constrained to the second longitudinal track 22 by means of a second coupling mechanism 56, which is fixed to the aforesaid second reaction component 54 and is removably engaged with the corresponding second longitudinal track 22, for example by means of second pins constrainable to corresponding second seat made in the second longitudinal track.

In operation, in order to move each second tower 6 along the corresponding second longitudinal track 22, the second displacement actuator 53 is driven to operate according to the following operating steps, assuming that such second displacement actuator 53 operates via traction on the second tower 6 and starting from a configuration in which the second displacement actuator 53 is retracted and the second coupling mechanism 56 is constrained to the second longitudinal track 22:

releasing the second coupling mechanism 56 from the second longitudinal track 22;

driving the second displacement actuator 53 in extension, in a manner such to move the second reaction component 54 along the second longitudinal track 22 away from the second tower 6;

newly constraining the second coupling mechanism 56 to the second longitudinal track 22;

driving the second displacement actuator 53 in retraction, in a manner such to draw the second tower 6 towards the second reaction component 54 by making the second tower 6 itself slide on the second longitudinal track 22.

The above-described operating steps are advantageously repeated until the second tower 6 is brought into the desired position along the second longitudinal track 22 (e.g. at the second station 15 or at the third station 20 of the apparatus 1).

Analogous operating steps are provided if the second displacement actuator 53 operates by thrusting against the second tower 6, which are clearly derivable by the man skilled in the art from the description of the aforesaid operating steps in which the second displacement actuator 53 operates via traction on the second tower 6.

Preferably, when each second tower 6 must be moved between the first and the second operating configuration, the second displacement actuators 53 are separated from the second tower 6 and/or from the second longitudinal track 22 (in particular also able to be removed) in order to allow the movement of the second tower 6 between the two longitudinal tracks 17, 22 by means of the translation elements 19.

Advantageously, with reference to the embodiments of FIGS. 7 and 8, the translation elements 19, arranged for moving the corresponding second tower 6 between the first and the second operating configuration (in which the second tower 6 is respectively inside and outside the first guide seat 5 of the corresponding first tower 2) comprise, for each second tower 6, a transverse track 57, which is extended according to a slide direction K orthogonal to the longitudinal directions Z', Z" of the corresponding longitudinal tracks 17, 22, and is placed to intercept such longitudinal tracks 17, 22 themselves.

In addition, the translation elements 19 comprise a movable platform 58 slidably mounted on the corresponding transverse track 57 and susceptible of receiving in abutment the corresponding second tower 6 when the latter is in the second station 15.

The translation elements 19 also comprise at least one actuator device 59 mechanically connected to the movable platform 58 and arranged for moving the latter along the transverse track 57 between a first position, in which the movable platform 58 is arranged to intercept the corresponding first longitudinal track 17 and is inserted in the first guide seat 5 of the corresponding first tower 2 in order to receive in abutment the corresponding second tower 6 arranged in the lowered position, and a second position, in which the movable platform 58 is arranged to intercept the corresponding second longitudinal track 22 in order to support, in abutment, the second tower 6 arranged in the second station 15 and in the aforesaid second operating configuration.

In particular, when each first tower 2 is arranged in the second station 15 of the apparatus 1, the first movement system 11 is drivable to move the second tower 6 until it is brought in abutment against the movable platform 58 arranged in the aforesaid first position. In this manner, the movable platform 58 is drivable to move the second tower 6 between the first and the second configuration of the latter.

Advantageously, the movable platform 58 is substantially coplanar with the first and with the second longitudinal tracks 17, 22, in a manner such to not interfere with the movement of the first tower 2 (with the second tower 6 at its interior) between the first and the second stations 13, of the apparatus 1, and in a manner such to not interfere with the movement of the second tower 6 between the second and the third stations 15, 20 of the apparatus 1 itself.

In particular, the movable platform 58, when it is arranged in its first position, defines corresponding portion of the corresponding first longitudinal track 17.

Preferably, the movable platform 58, when it is arranged in its second position, defines a corresponding portion of the corresponding second longitudinal track 22, in particular defining at least one part of the overlapping section 22' of the second longitudinal track 22 itself. Advantageously, in accordance with the embodiment illustrated in FIG. 8, the transverse track 57 comprises a third metal framework, in particular provided with multiple longitudinal beams 60 parallel to the slide direction K of the transverse track 57 itself.

Preferably, the movable platform 58 comprises a fourth metal framework extended, according to the slide direction K of the transverse track 57, between an external bar 61 (directed towards the first longitudinal track 17) and an internal bar 62 (directed towards the second longitudinal track 22). The external bar 61 and the internal bar 62 are in particular connected to each other by transverse bars 63, advantageously intercepted by one or more intermediate bars 64 arranged between the external bar 61 and the internal bar 62 and parallel thereto.

Advantageously, each actuator device 59 of the translation elements 19 is of linear type and is at least partially inserted in at least one corresponding passage 65 obtained in the thickness of the corresponding said movable platform 58.

In particular, each actuator device 59 comprises a first end 59' constrained to the transverse track 57 at the second longitudinal track 22 and a second end 59" constrained to the external bar 61 of the movable platform 58.

Preferably, each actuator device 59 is inserted in the corresponding passage 65 obtained by means of a first through hole 65' made in the internal bar 62 of the movable platform 58 and advantageously by means of at least one second through hole 65" made in the intermediate bar 64 of the movable platform 58 itself.

Figure 15:
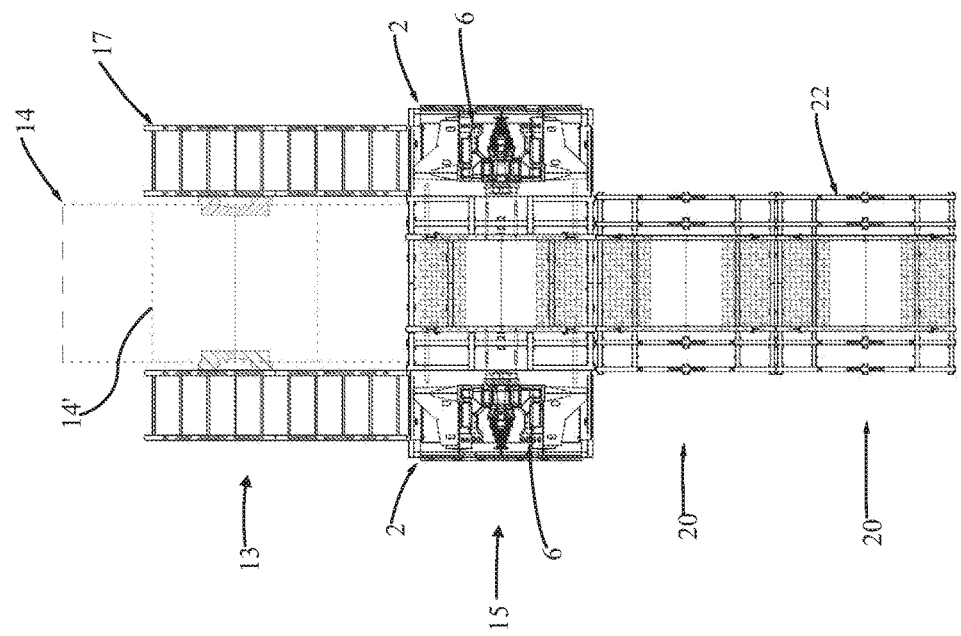
FIG. 15 shows a plan view of the apparatus at the end of the step of positioning the first reel.
Figure 14:
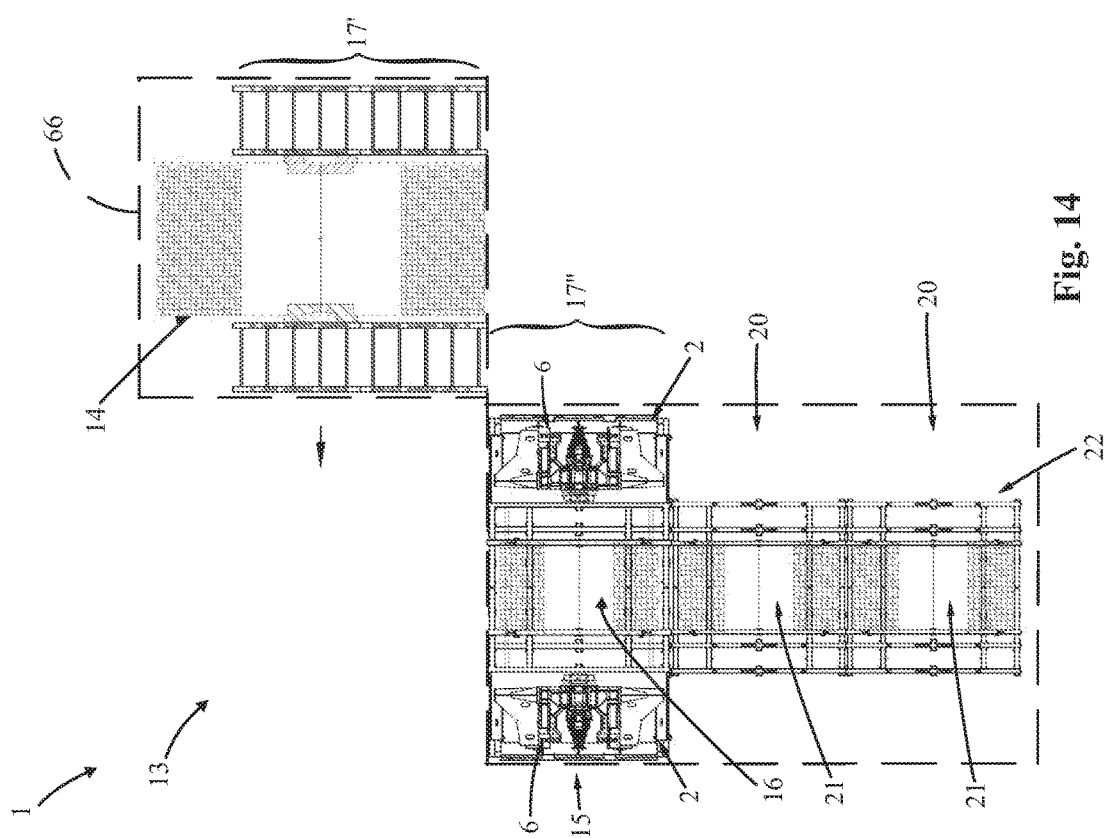
FIG. 14 shows a plan view of the apparatus during a step of positioning a first reel in a first station of the apparatus itself.

Advantageously, with reference to the embodiments of FIGS. 14 and 15, the apparatus 1 comprises a first movable deck 66, on which the first abutment seat 13' of the first station 13 is arranged, against which the first reel 14 is intended to be abutted.

Such movable deck 66 is movable (by means of movement devices per se known and for this reason not described hereinbelow) in order to bring the first reel 14 (previously arranged on the first abutment seat 13') to the first station 13 of the apparatus 1, allowing the execution of a transfer of the first reel 14 for example between a wharf or a ship and the support structure on which the apparatus 1 itself is mounted.

Preferably, each first longitudinal track 17 comprises a movable section 17' fixed to the movable deck 66 and connected to the first station 13, and a remaining fixed section 17" connected to the second station 15 and intended to be fixed on the support structure on which the apparatus 1 is mounted.

Advantageously, the two movable and fixed sections 17', 17" of each first longitudinal track 17 are fixed to each other, for example by means of bolting or flanging, when the movable deck 66 is arranged in the first station 13 with the movable section 17' aligned with the corresponding fixed section 17".

One object of the present invention is also constituted by a method of operation of an apparatus 1 for the unwinding of cables on seabeds of the above-described type.

Hereinbelow, for description simplicity, reference will be made to the same nomenclature introduced up to now, even if it must be intended that the present method can also be obtained with apparatuses that are not provided with all the above-described characteristics.

The present method provides for a first step of arranging the first reel 14 in the first station 13 abutted against first abutment seat 13'.

Advantageously, with reference to FIGS. 14 and 15, the first step of arranging the first reel 14 provides that the latter is arranged on the first abutment seat 13' on the movable deck 66, and that the latter is translated (for example by a wharf or by a transport ship) onto the support structure (e.g. the deck of a ship) on which the apparatus 1 is mounted, until the movable sections 17' (arranged on the movable deck 66) of the first longitudinal track 17 are brought to be aligned with the corresponding fixed sections 17" mounted on the support structure (as illustrated in the embodiment of FIG. 15).

Preferably, once the movable section 17' of each first longitudinal track 17 is aligned with the corresponding fixed section 17", the latter is fixed to the movable section 17' for example by means of bolting or flanging.

In particular, during the aforesaid first step of arranging the first reel 14, the first towers 2 are arranged in the second station 15 in order to prevent the first towers 2 themselves from interfering with the movement of the movable deck 66.

The present method also comprises a second step of arranging the second reel 16 on the second abutment seat 15' of the second station 15, and advantageously comprises a third step of arranging the third reel 21 on the third abutment seat 20' of the third station 20. In particular, if use is provided of multiple third reels 21, in the aforesaid third arranging step each third reel 21 is arranged on the third abutment seat 20' of the corresponding third station 20.

In particular, the second and third step of arranging respectively the second and third reels 16, 21 is obtained by means of a crane driven to carry each second and third reel 16, 21 from the wharf or from the transport ship to the corresponding abutment seats 15', 20' of the apparatus 1.

Of course, the aforesaid second and third arranging step can be executed before or after the first step of arranging the first reel 14, given that the order with which the aforesaid steps of arranging reel 14, 16, 21 are executed is not binding for the protective scope of the present finding. Preferably, during the second and the third arranging step, the first and the second towers 2, 6 are respectively arranged outside the second and third station 15, 20 of the apparatus 1 in order to facilitate the movement of the second and of the third reel 16, 21.

Figure 17:
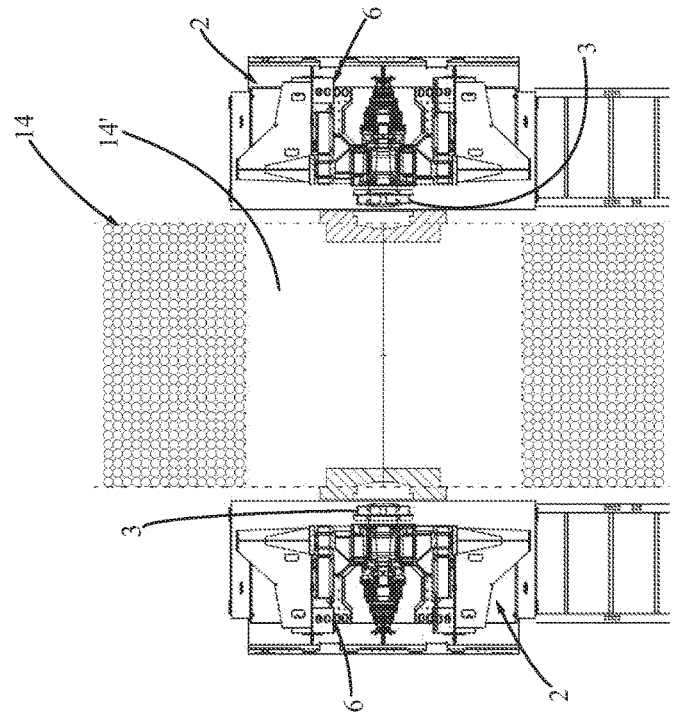
FIG. 17 shows a detail of the apparatus illustrated in FIG. 16 relative to the first station in which the first reel and the towers are arranged.
Figure 16:
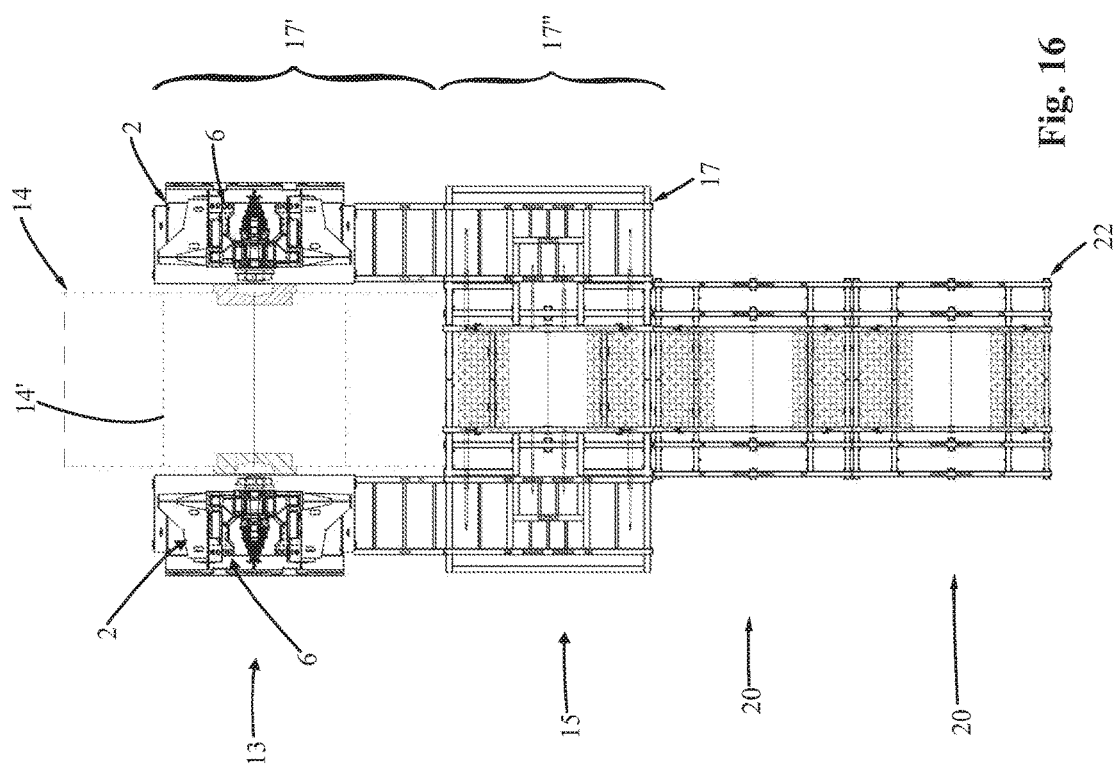
FIG. 16 shows a plan view of the apparatus during a step of associating the first towers with the first reel.

After the aforesaid first step of arranging the first reel 14, the present method provides for a step of associating the first towers 2 with the first reel 14 itself. In such association step, the first towers 2 (carrying, housed in their first guide seat 5, the corresponding second towers 6) are arranged in the first station 13 with the first reel 14 interposed between the first towers 2 themselves, as illustrated in the embodiments of FIGS. 16 and 17.

Advantageously, before the aforesaid first association step, the two first towers 2 are moved away from each other, in particular by means of the actuation of the first connection actuators 27, in a manner such to arrange the two first towers 2 at a distance from each other that is sufficient for allowing the interposition of the first reel 14 between the two first towers 2 themselves.

Preferably, in the first association step, the two first towers 2 are driven to be moved on the corresponding first longitudinal track 17 from the second station 15 to the first station 13, in particular by means of the actuation of the first movement elements 18.

The present method also provides for a first step of aligning the hubs 3 with the first reel 14. In such first alignment step, the second towers 6 are moved to slide along the corresponding first guide seat 5, in particular by means of the actuation of the first movement system 11, in order to arrange the hubs 3 aligned with the first drum 14' of the first reel 14.

Advantageously, the aforesaid first alignment step can optionally provide for, in addition to the movement of each second tower 6 in the corresponding first guide seat 5, also the movement of each hub-holder group 8 in the corresponding second guide seat 7, for example providing for moving the second towers 6 in order to obtain a more approximate adjustment of the hubs 3 and for moving the hub-holder groups 8 in order to obtain a more precise adjustment of the hubs 3. The present method provides for a first step of engaging the hubs 3 with the first reel 14, and in such first engagement step the hubs 3 are connected to the first drum 14' of the first reel 14 in order to rotatably support the first reel 14 itself.

Figure 19:
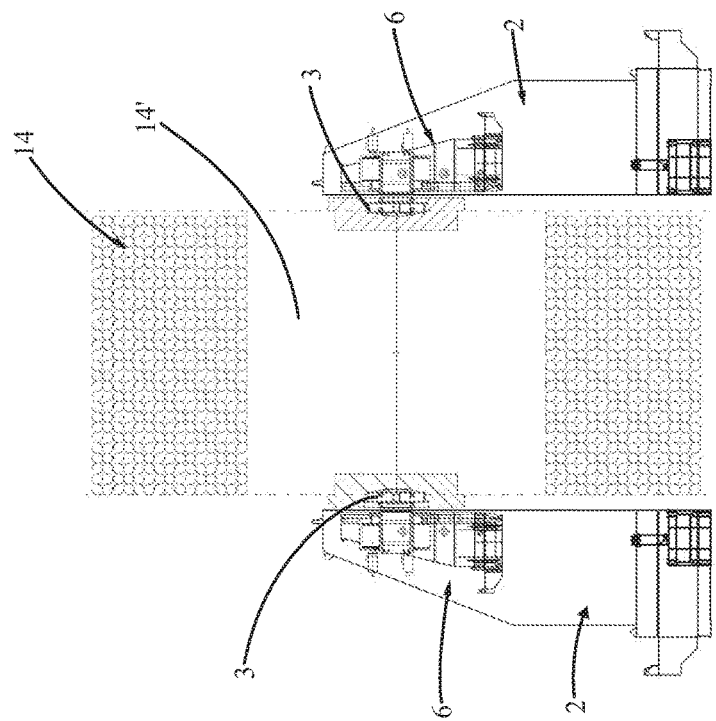
FIG. 19 shows a section view of the apparatus illustrated in FIG. 18 according to the line XIX-XIX of FIG. 18 itself.
Figure 18:
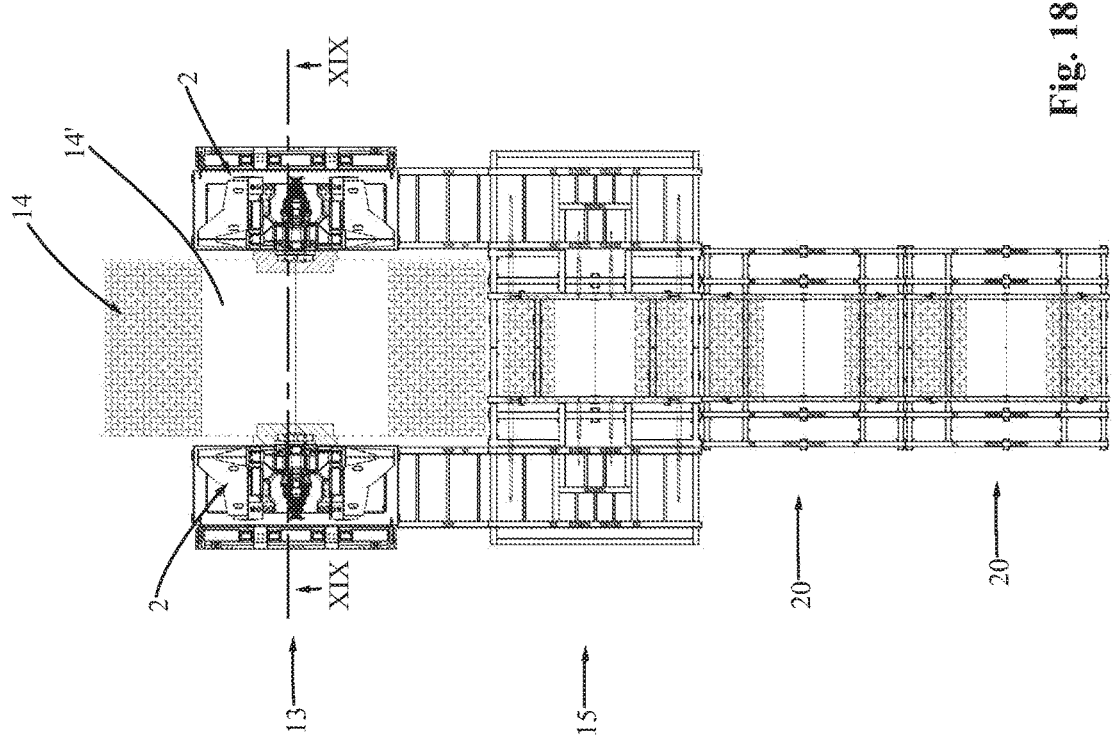
FIG. 18 shows a plan view of the apparatus during a step of engaging the hubs of the apparatus with the first reel.

In particular, with reference to the embodiments illustrated in FIGS. 18 and 19, in the first engagement step the first towers 2 are driven to be moved towards each other, preferably by means of the actuation of the first connection actuators 27, until each hub 3 is brought to be engaged with the corresponding end of the first drum 14' of the first reel 14.

A first step is provided for lifting the first reel 14 from the first abutment seat 13' of the first station 13. More in detail, in such first lifting step the second towers 6 are driven (in particular by means of the first movement system 11) to be moved upward along the first guide seat 5 of the corresponding first towers 2 in order to separate the first reel 14 from the first abutment seat 13', so as to allow the rotation of the first reel 14 itself.

Then, a first step is provided for unwinding the first cable of the first reel 14. In particular, in the first unwinding step the hubs 3 are driven by the corresponding motors 10 to rotate in order to in turn rotate the first reel 14, in a manner such to unwind the first cable and make it descend onto the seabed (in a manner per se known to the man skilled in the art).

After the first unwinding step, the present method comprises a first step of lowering the first reel 14 onto the first abutment seat 13' of the first station 13. In the aforesaid first lowering step, the second towers 6 are driven to be moved (in particular by means of the first movement system 11) downward along the first guide seat 5 of the corresponding first towers 2, until the first reel 14 is brought to be abutted against the first abutment seat 13'.

In particular, the movement of each second tower 6, during the aforesaid first alignment step, first lifting step and first lowering step, is obtained by means of the actuation of the first movement actuators 32 and of the first and second locking devices 30, 31 of the first movement system 11, in accordance with the operating steps previously described in detail.

Figure 20:
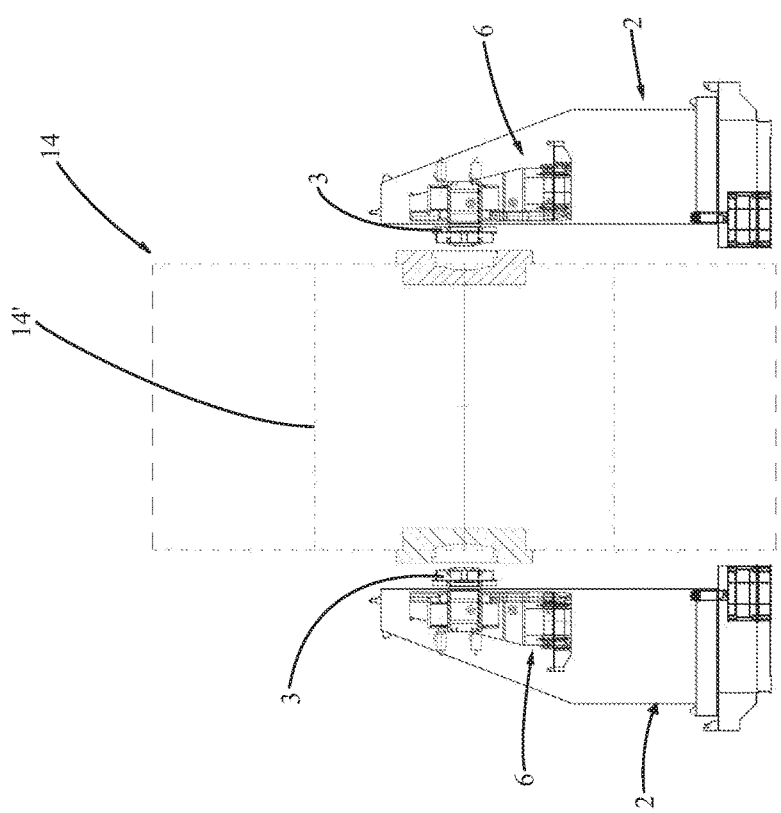
FIG. 20 shows a section view of the towers during a step of disengaging the hubs from the first reel.

A first step of disengaging the hubs 3 from the first reel 14 is also provided for; in such first disengagement step, the hubs 3 are separated from the first drum 14' of the first reel 14 itself. In particular, with reference to the embodiment illustrated in FIG. 20, in the first disengagement step the first towers 2 are driven to be moved away from each other, preferably by means of the actuation of the first connection actuators 27, until each hub 3 is brought to be separated from the corresponding end of the first drum 14' of the first reel 14.

Figure 21:
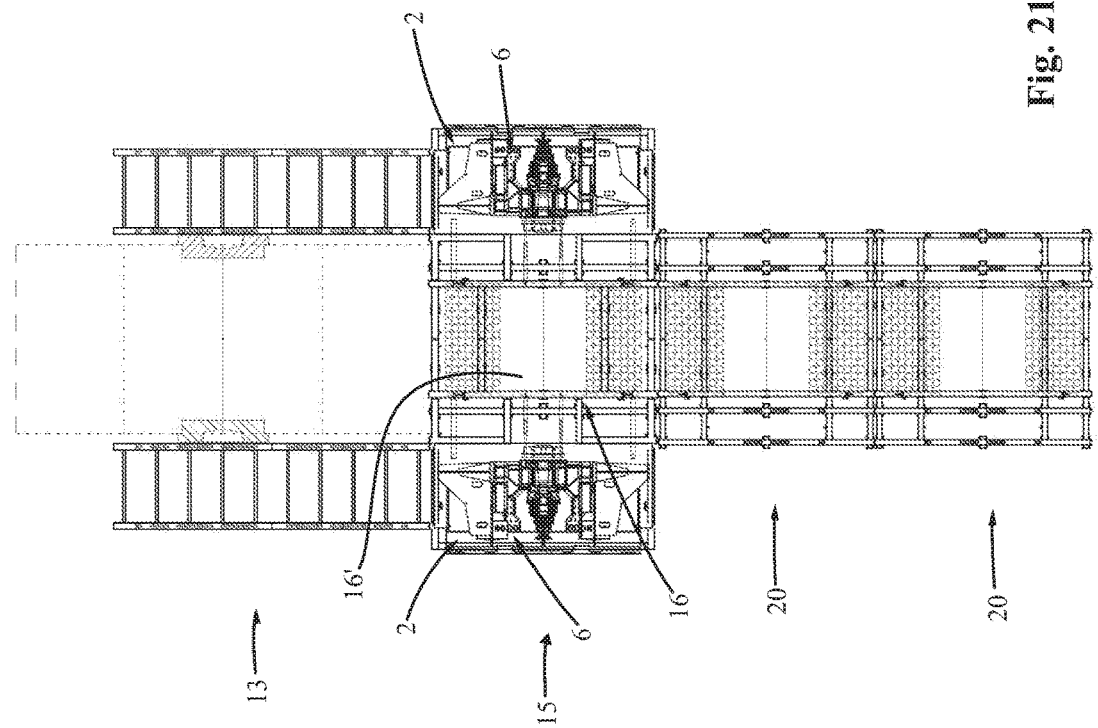
FIG. 21 shows a plan view of the apparatus during a step of moving the towers between the first station and a second station in which a second reel is arranged.

The present method then provides for a first step of moving the first towers 2 (with the second towers 6 arranged in the first guide seat 5 of the corresponding first towers 2) from the first station 13 to the second station 15 in which the second reel 16 to be used is arranged, in accordance with the embodiment illustrated in FIG. 21.

Advantageously, in the aforesaid first movement step, the two first towers 2 are driven to be moved on the corresponding first longitudinal track 17 from the first station 13 to the second station 15, in particular by means of the actuation of the first movement elements 18.

Preferably, when each first tower 2 is brought into the second station 15, the corresponding second tower 6 is lowered, carrying the latter in abutment against the movable platform 58 of the translation elements 19 arranged in its first position, as represented in the embodiment of FIG. 5.

Advantageously, with reference to the embodiment of FIG. 6, the first movement actuators 32 are detached from the corresponding second tower 6 (e.g. by removing the connection pin that connects the eyebolts of the second tower 6 to the perforated plate of the first movement actuators 32).

Figure 22A:
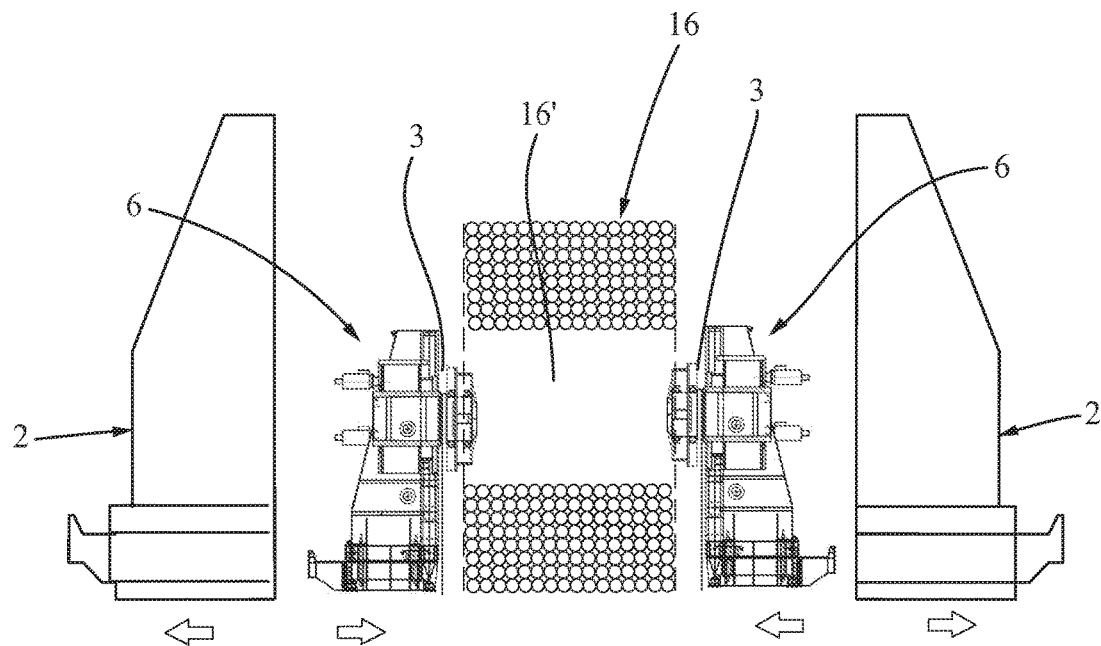
FIGS. 22a and 22b respectively show a side view and a plan view of the second station of the apparatus during a step of translating the second towers with respect to the corresponding first towers.
Figure 22B:
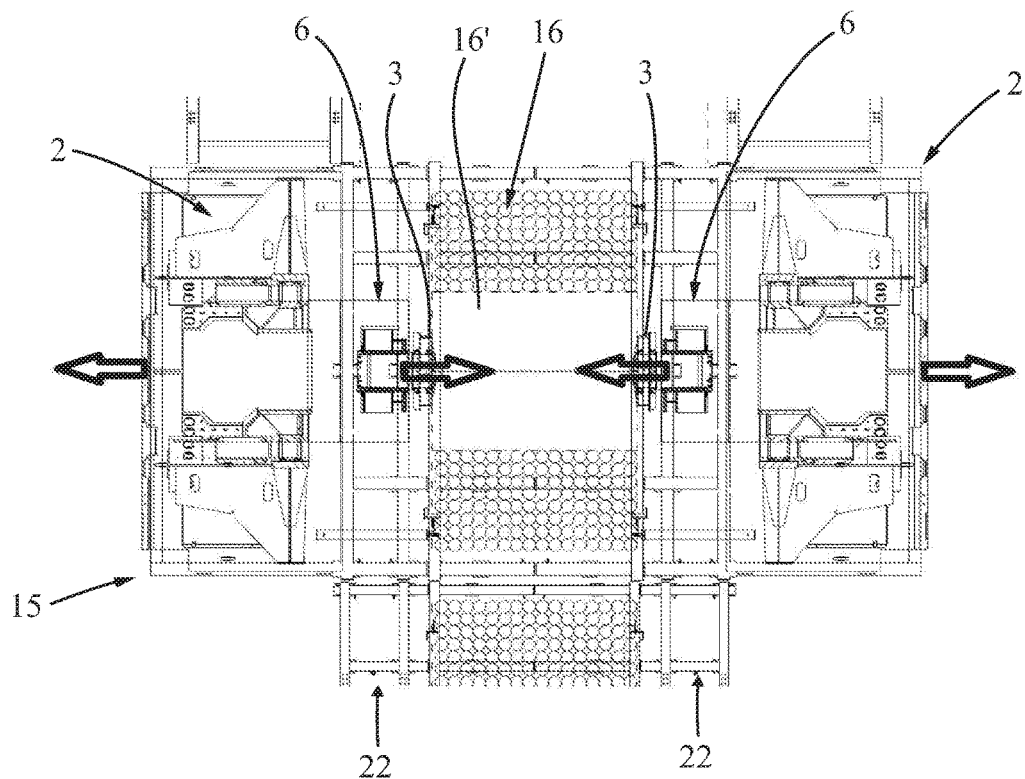

With reference to the embodiments illustrated in FIGS. 7, 22a and 22b, the present method then provides for a step of translating each second tower 6 with respect to the corresponding first tower 2, and in such translation step each second tower 6 is moved from the first operating configuration, in which the second tower 6 is arranged inside the first guide seat 5 of the corresponding first tower 2, to the second operating configuration, in which the second tower 6 is outside the first guide seat 5 of the corresponding first tower 2.

Advantageously, in such translation step, each second tower 6 is moved from the first operating configuration, in which the second tower 6 is arranged on the corresponding first longitudinal track 17, to the second operating configuration, in which the second tower 6 is arranged on the second longitudinal track 22.

In particular, in the aforesaid translation step, each second tower 6 is extracted from the first guide seat 5 of the corresponding first tower 2 and is advantageously arranged above the corresponding second longitudinal track 22.

Preferably, with reference to the embodiment illustrated in FIG. 7, in the translation step each movable platform 58 of the translation elements 19 is driven by the corresponding actuator devices 59 to be moved from its first position (in which it is arranged inside the first guide seat 5 of the corresponding first tower 2) to its second position (in which it is arranged outside the first guide seat 5) in order to bring the corresponding second tower 6 outside the first guide seat 5 itself so as to separate such second tower 6 from the corresponding first tower 2.

Advantageously, when the movable platform 58 is in its first position, the movable platform 58 is aligned with the corresponding first longitudinal track 17 in order to receive in abutment the second tower 6 when it is lowered by the first movement system 11. When the movable platform 58 is in its second position, the movable platform 58 is aligned with the corresponding second longitudinal track 22 in order to allow the second tower 6 to slide along such second longitudinal track 22 in an operating step described hereinbelow.

Advantageously after the step of translating each second tower 6 with respect to the corresponding first tower 2, a second step is provided for aligning the hubs 3 with the second reel 16. In such second alignment step, the hub-holder groups 8 are moved (in particular by means of the second movement system 12) to slide along the second guide seat 7 of the corresponding second towers 6, until the hubs 3 are arranged aligned with the second drum 16' of the second reel 16.

Then, a first step is provided for engaging the hubs 3 with the second reel 16, and in such second engagement step the hubs 3 are connected to the second drum 16' of the second reel 16 in order to rotatably support the second reel 16 itself.

In particular, in the second engagement step the second towers 6 are driven to be moved towards each other, preferably by means of the actuation of the second connection actuators 44, until each hub 3 is brought to be engaged with the corresponding end of the second drum 16' of the second reel 16.

The present method comprises a second step of lifting the second reel 16 from the second abutment seat 15' of the second station 15. In such second lifting step, the hub-holder groups 8 are driven to be moved (in particular by means of the actuation of the second movement system 12) upward along the second guide seat 7 of the corresponding second towers 6 in order to separate the second reel 16 from the second abutment seat 15' so as to allow the rotation of the second reel 16 itself.

A second step is then provided for unwinding the second cable from the second reel 16 in order to lay the second cable on the seabed. In particular, in the second unwinding step, the hubs 3 are driven by the corresponding motors 10 to rotate in order to in turn rotate the second reel 16, in a manner such to unwind the second cable and make it descend on the seabed.

Once the second unwinding step of the second reel 16 has terminated, a second step is provided for lowering the second reel 16 itself on the second abutment seat 15' of the second station 15. More in detail, in the second lowering step, the hub-holder groups 8 are driven to be moved (in particular by means of the actuation of the second movement system 12) downward along the second guide seat 7 of the corresponding second towers 6 until the second reel 16 is brought to be abutted against the second abutment seat 15'.

In particular, the movement of each hub-holder group 8, during the aforesaid second alignment step, second lifting step and second lowering step, is obtained by means of the actuation of the second movement actuators 49 and of the third and fourth locking devices 47, 48 of the second movement system 12, in accordance with the operating steps previously described in detail.

Figure 23:
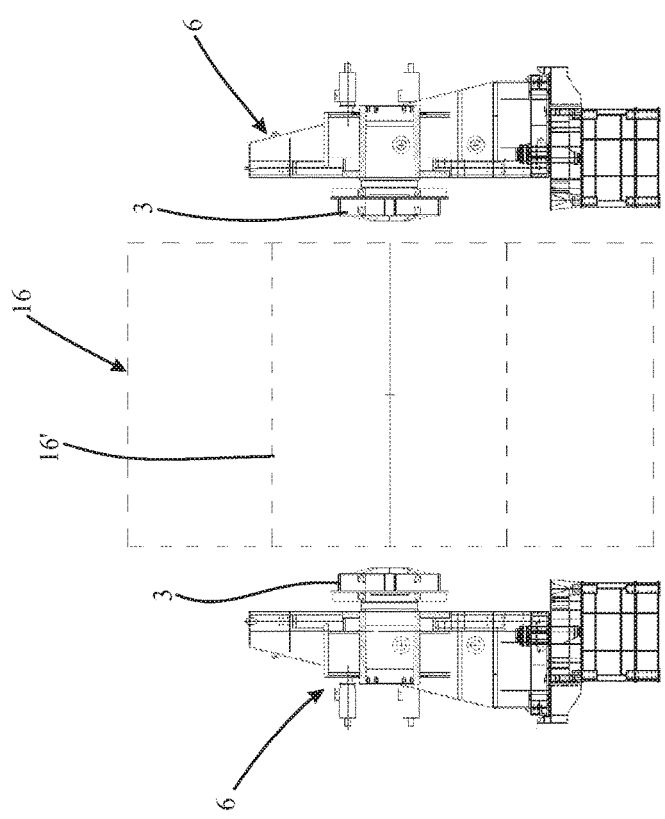
FIG. 23 shows a front view of the second station of the present apparatus during a second step of disengaging from the second reel.

A second step is also provided for disengaging the hubs 3 from the second reel 16, and in such second disengagement step the hubs 3 are separated from the second drum 16' of the second reel 16 itself. In particular, with reference to the embodiment illustrated in FIG. 23, in the second disengagement step the second towers 6 are driven to be moved away from each other, preferably by means of the actuation of the second connection actuators 44, until each hub 3 is brought to be separated from the corresponding end of the second drum 16' of the second reel 16.

Figure 24:
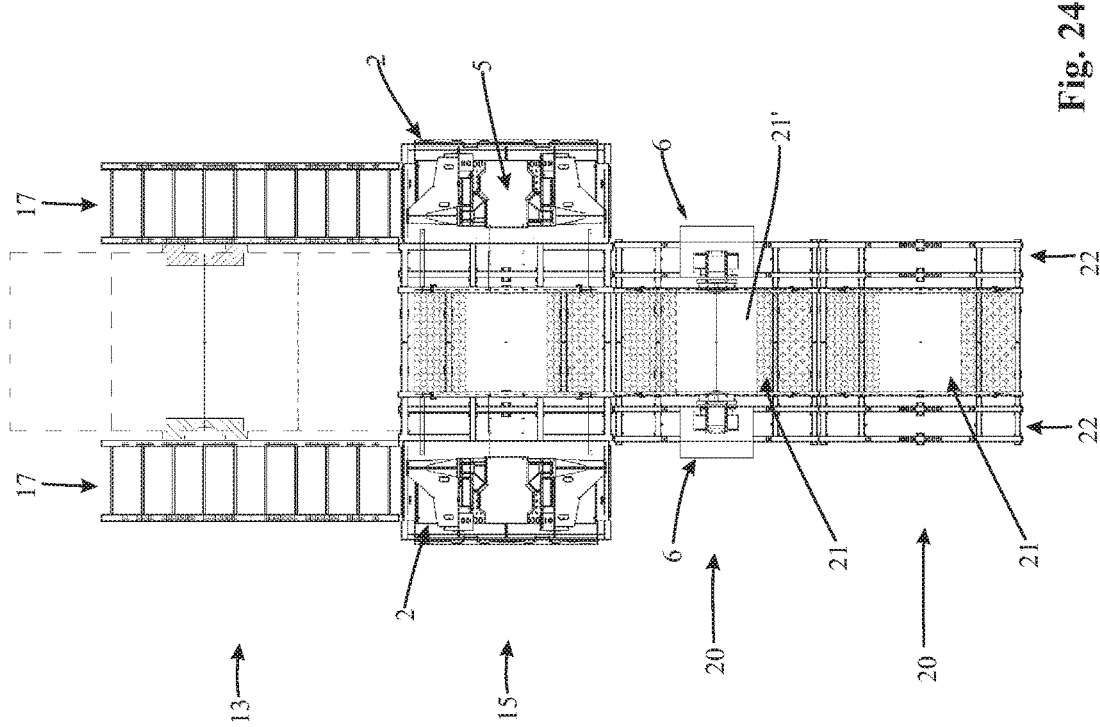
FIG. 24 shows a plan view of the apparatus during a step of moving the second towers between the second station and a third station in which a third reel is arranged.

Advantageously, the method comprises a second step of moving, along the second longitudinal track 22, each second tower 6 from the second station 15 to the third station 20 in which the third reel 21 to be used is arranged, as illustrated in the embodiment of FIG. 24.

Preferably, in the aforesaid second movement step, the two second towers 6 are driven to be moved onto the corresponding second longitudinal track 22 from the second station 15 to the third station 20, in particular by means of the actuation of the second movement elements 23.

The present method then comprises (analogous to that provided for the second reel 16):

a third step of aligning the hubs 3 with the third reel 21, and in such third alignment step the hub-holder groups 8 are moved to slide along the corresponding second guide seat 7 until the hubs 3 are arranged aligned with the third drum 21' of the third reel 21;

a third step of engaging the hubs 3 with the third reel 21, and in such third engagement step the hubs 3 are connected to the third drum 21' of the third reel 21 in order to rotatably support the third reel 21 itself;

a third step of lifting the third reel 21 from the third abutment seat 20' of the third station 20, and in such third lifting step the hub-holder groups 8 are driven to be moved upward along the corresponding second guide seat 7 in order to separate the third reel 21 from the third abutment seat 20';

a third step of unwinding the third cable from the third reel 21, a third step of lowering the third reel 21 onto the third abutment seat 20', and in such third lowering step the hub-holder groups 8 are driven to be moved downward along the corresponding second guide seat 7 until the third reel 21 is brought to be abutted against the third abutment seat 20'.

Suitably, if the method provides for the use of multiple third reels 21, a third step is provided for moving each second tower 6 from the third station 20 to the other third station 20 and it is provided to execute the above-described aforesaid third operating steps.

Of course, according to the present method, the unwinding of reel 14, 16, 21 can occur with a different order with respect to that reported above, for example by providing for the unwinding of the second reel 16 before the first reel 14, without departing from the scope of the present patent.

In particular, the step of moving the first towers 2 can also occur from the second station 15 to the first station 13, and the step of moving the second towers 6 can also occur from the third station 20 to the second station 15.

The invention thus conceived therefore attains the pre-established objects.

The invention claimed is:

1. An apparatus for unwinding flexible cables on seabeds, which comprises:
   two first towers arranged parallel to and spaced from each other;
   two hubs, which are arranged facing each other, and are susceptible to be associated with the corresponding said first towers;
   movement elements arranged for moving each said hub along the corresponding said first tower;
   each said first tower comprising a first guide seat extended along a first substantially vertical movement direction (Y');
   said apparatus further comprising:
   two second towers arranged parallel to and spaced from each other, each of the second towers provided with a second guide seat extended along a second movement direction (Y") parallel to said first movement direction (Y');
   two hub-holder groups, each of which is slidably constrained to the second guide seat of the corresponding said second tower and carries, rotatably mounted thereon, the corresponding said hub;
   translation elements, which are arranged for moving each said second tower between a first operating configuration, in which each said second tower is slidably constrained in the first guide seat of said corresponding first tower, and a second operating configuration, in which each said second tower is arranged outside the first guide seat of said corresponding first tower;
   said movement elements comprising:
   a first movement system mechanically connected to said second towers and arranged for moving each said second tower, arranged in said first operating configuration, in the corresponding said first guide seat along said first movement direction (Y'); and
   a second movement system mechanically connected to said hub-holder groups and arranged for moving each said hub-holder group in the corresponding said second guide seat along said second movement direction (Y").

2. The apparatus according to claim 1, further comprising:
   a first station provided with a first abutment seat on which a first reel is intended to be arranged, said first reel provided with a first drum;

a second station provided with a second abutment seat on which a second reel is intended to be arranged, said second reel provided with a second drum;

two first longitudinal tracks, which are arranged parallel to each other and are extended at least between said first station and said second station, and on each of said first longitudinal tracks, the corresponding said first tower is slidably arranged; and first movement elements, which are mechanically connected to said first towers and, with said second towers in said first operating configuration, are arranged for moving said first towers to slide along the corresponding said first longitudinal tracks between said first station, in which said hubs are susceptible to be engaged with the first drum of said first reel, and said second station, in which said hubs are susceptible to be engaged with the second drum of said second reel.

3. The apparatus according to claim 2, wherein said first movement system is arranged for moving the corresponding said second tower, arranged in said first operating configuration, along said corresponding first movement direction (Y') between at least one raised position, in which the corresponding said second tower is at least partially lifted from the corresponding said first longitudinal track, and a lowered position, in which the corresponding said second tower is placed in abutment against said corresponding first longitudinal track.

4. The apparatus according to claim 3, further comprising:

a third station provided with a third abutment seat on which a third reel is intended to be arranged, said third reel provided with a third drum;

two second longitudinal tracks, which are arranged parallel to each other, are extended at least between said second station and said third station, and on each of said second longitudinal tracks, the corresponding said second tower is slidably arranged in said second operating configuration; and second movement elements which, with said second towers arranged in said second operating configuration, are mechanically connected to said second towers and are arranged for moving said second towers along the corresponding said second longitudinal tracks at least between said second station, in which said hubs are susceptible to be engaged with the second drum of said second reel, and said third station, in which said hubs are susceptible to be engaged with the third drum of said third reel.

5. The apparatus according to claim 4, wherein said first movement system is arranged for moving the corresponding said second tower, arranged in said first operating configuration, along said corresponding first movement direction (Y') between at least one raised position, in which said second tower is at least partially lifted from the corresponding said first longitudinal track, and a lowered position, in which said second tower is placed in abutment against said corresponding first longitudinal track; and wherein said translation elements are arranged at said second station and, with said first towers arranged in said second station, are arranged for moving each said second tower between said first operating configuration, in which said second tower is arranged in said lowered position on said first longitudinal track, and said second operating configuration, in which said second tower is arranged on the corresponding said second longitudinal track.

6. The apparatus according to claim 4, wherein said second longitudinal tracks are provided with corresponding overlapping sections extended in said second station and arranged between said first longitudinal tracks.

7. The apparatus according to claim 4, wherein said translation elements, for each second tower, comprise:

a transverse track, which is extended substantially orthogonally to the corresponding said first longitudinal track and said second longitudinal track, and is placed to intercept said first longitudinal track and said second longitudinal track;

a movable platform slidably mounted on the corresponding said transverse track and susceptible to receive, in abutment, the corresponding said second tower; and at least one actuator device mechanically connected to the corresponding said movable platform and arranged for moving said movable platform along the corresponding said transverse track between a first position, in which said movable platform is arranged to intercept the corresponding said first longitudinal track and is inserted in the first guide seat of the corresponding said first tower in order to receive, in abutment, the corresponding said second tower arranged in said lowered position, and a second position, in which said movable platform is arranged to intercept the corresponding said second longitudinal track in order to support, in abutment, said second tower arranged in said second station and in said second operating configuration.

8. The apparatus according to claim 7, wherein said actuator device is of linear type and is at least partially inserted in a corresponding passage obtained in the thickness of the corresponding said movable platform.

* * * * *